United States Patent
Zhou et al.

(10) Patent No.: US 12,464,417 B2
(45) Date of Patent: Nov. 4, 2025

(54) DYNAMIC REPORTING TECHNIQUES FOR INTER-CELL MOBILITY

(71) Applicant: QUALCOMM Incorporated, San Diego, CA (US)

(72) Inventors: Shanyu Zhou, San Diego, CA (US); Jelena Damnjanovic, Del Mar, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 17/842,646

(22) Filed: Jun. 16, 2022

(65) Prior Publication Data

US 2023/0413130 A1   Dec. 21, 2023

(51) Int. Cl.
*H04W 36/00* (2009.01)
*H04W 36/32* (2009.01)

(52) U.S. Cl.
CPC ... *H04W 36/0058* (2018.08); *H04W 36/0094* (2013.01); *H04W 36/32* (2013.01)

(58) Field of Classification Search
CPC . H04W 24/10; H04W 36/00; H04W 36/0005; H04W 36/0016; H04W 36/0055; H04W 36/0058; H04W 36/0085; H04W 36/0088; H04W 36/0094; H04W 36/24; H04W 26/26; H04W 36/28; H04W 36/30; H04W 36/302; H04W 36/304;
(Continued)

(56) References Cited

U.S. PATENT DOCUMENTS

2020/0266876 A1* 8/2020 Yu .................... H04W 80/02
2021/0385708 A1 12/2021 Damnjanovic et al.
(Continued)

FOREIGN PATENT DOCUMENTS

WO   WO-2021161065 A1   8/2021

OTHER PUBLICATIONS

International Search Report and Written Opinion—PCT/US2023/024467—ISA/EPO—Aug. 30, 2023.
(Continued)

*Primary Examiner* — Matthew W Genack
(74) *Attorney, Agent, or Firm* — Guang Y. Zhang; Holland & Hart LLP

(57) ABSTRACT

Methods, systems, and devices for wireless communications are described. A user equipment (UE) may receive first control signaling indicating a configuration of a set of serving cells for inter-cell mobility procedures and a layer one (L1) report configuration. The UE may transmit, in accordance with the L1 report configuration, an L1 report including channel information associated with one or more cell groups of the set of serving cells, where the one or more cell groups include both active and inactive serving cells for the inter-cell mobility procedures. In some cases, the UE may receive second control signaling modifying the L1 report configuration. The second control signaling may indicate parameters of the L1 report configuration to be updated, such as cells or cell groups to be reported, quantities to measure and/or include in the L1 report, etc. The UE may update the L1 report configuration based on the second control signaling.

24 Claims, 19 Drawing Sheets

(58) Field of Classification Search
CPC . H04W 36/305; H04W 36/32; H04W 36/322; H04W 36/324
See application file for complete search history.

(56) References Cited

U.S. PATENT DOCUMENTS

2022/0239429 A1* 7/2022 Zhu ................ H04L 5/0005
2023/0337020 A1* 10/2023 Da Silva .......... H04W 24/04

OTHER PUBLICATIONS

VIVO: "Remaining Issues on Multi Beam Enhancement", 3GPP TSG RAN WG1 #107-e, R1-2110990, 3rd Generation Partnership Project, Mobile Competence Centre, 650, Route Des Lucioles, F-06921 Sophia-Antipolis Cedex, France, vol. RAN WG1, No. e-Meeting; Nov. 11, 2021-Nov. 19, 2021, Nov. 5, 2021, 27 Pages, XP052073946, Paragraph [03.3].

* cited by examiner

| Cell | Report Configuration |
|---|---|
| PCID 0 | L1 RSRP |
| PCID 1 | L1 RSRP |
| PCID 2 | L1 RSRP |
| PCID 3 | L1 RSRP |

Cell Group 305-a

| Cell | Report Configuration |
|---|---|
| PCID 0 | L1 RSRP |
| PCID 2 | L1 RSRP |
| PCID 3 | L1 RSRP |

Cell Group 305-b

| Cell | Report Configuration |
|---|---|
| PCID 1 | L1 RSRP |

Cell Group 305-c

| Cell | Report Configuration |
|---|---|
| PCID 0 | L1 RSRP |
| PCID 1 | L1 RSRP |
| PCID 2 | L1 RSRP |
| PCID 3 | L1 RSRP |

Cell Group 605-a

| Cell | Report Configuration |
|---|---|
| PCID 0 | L1 RSRP |
| PCID 1 | L1 RSRP |

Cell Group 605-b

| Cell | Report Configuration |
|---|---|
| PCID 0 | L1 RSRP |
| PCID 2 | L1 RSRP |

Cell Group 605-c

DYNAMIC REPORTING TECHNIQUES FOR INTER-CELL MOBILITY

FIELD OF TECHNOLOGY

The following relates to wireless communications, including dynamic reporting techniques for inter-cell mobility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). Some wireless communications systems support inter-cell mobility, where a communication device (e.g., a base station or a UE) may perform handover procedures between cells in the system based on channel conditions associated with different cells.

SUMMARY

The described techniques relate to improved methods, systems, devices, and apparatuses that support dynamic reporting techniques for inter-cell mobility. For example, the described techniques provide for a user equipment (UE) to receive control signaling that indicates a configured set of serving cells for inter-cell mobility procedures and a layer one (L1) report configuration. The UE may use the L1 report configuration to report measurements associated with one or more cell groups of the configured set of serving cells, where the one or more cell groups may include both active serving cells and inactive serving cells for the inter-cell mobility procedures. For example, the UE may perform channel measurements for one or more cell groups based on the L1 report configuration. The UE may determine channel information for the one or more cell groups based on the channel measurements and may transmit an L1 report including the channel information in accordance with the L1 report configuration.

In some cases, the UE may receive additional control signaling that updates or otherwise modifies the L1 report configuration. For example, the control signaling may indicate a first reporting format for the L1 report, and the UE may receive second control signaling that indicates a second reporting format for the L1 report. The second reporting format may be modified with respect to the first reporting format. For example, the second control signaling may indicate parameters of the L1 report configuration to be modified, such as one or more cells or cell groups for which the UE is to transmit the L1 report, a change in cells of a cell group, a periodicity of the L1 report, one or more quantities to measure and/or include in the L1 report, or the like. The UE may update the L1 report configuration based on the second reporting format and may transmit the L1 report in accordance with the updated L1 report configuration.

A method for wireless communications at a UE is described. The method may include receiving first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures, performing one or more channel measurements for the one or more cell groups based on the L1 report configuration, and transmitting an L1 report including channel information for the one or more cell groups based on the one or more channel measurements, the L1 report being transmitted in accordance with the L1 report configuration.

An apparatus for wireless communications at a UE is described. The apparatus may include a processor, memory coupled with the processor, and instructions stored in the memory. The instructions may be executable by the processor to cause the apparatus to receive first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures, perform one or more channel measurements for the one or more cell groups based on the L1 report configuration, and transmit an L1 report including channel information for the one or more cell groups based on the one or more channel measurements, the L1 report being transmitted in accordance with the L1 report configuration.

Another apparatus for wireless communications at a UE is described. The apparatus may include means for receiving first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures, means for performing one or more channel measurements for the one or more cell groups based on the L1 report configuration, and means for transmitting an L1 report including channel information for the one or more cell groups based on the one or more channel measurements, the L1 report being transmitted in accordance with the L1 report configuration.

A non-transitory computer-readable medium storing code for wireless communications at a UE is described. The code may include instructions executable by a processor to receive first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures, perform one or more channel measurements for the one or more cell groups based on the L1 report configuration, and transmit an L1 report including channel information for the one or more cell groups based on the one or more channel measurements, the L1 report being transmitted in accordance with the L1 report configuration.

Some examples of the method, apparatuses, and non-transitory computer-readable medium described herein may further include operations, features, means, or instructions for receiving second control signaling indicating a second reporting format for the L1 report that may be modified with respect to a first reporting format indicated by the first control signaling and updating the L1 report configuration based on the second reporting format, the L1 report being based on the updated L1 report configuration.

In some examples of the method, apparatuses, and non-transitory computer-readable medium described herein, performing the one or more channel measurements may include operations, features, means, or instructions for performing the one or more channel measurements for the one or more serving cells based on the second control signaling, where the L1 report includes channel information for the one or more serving cells in accordance with the second control signaling.

In some examples of the method, apparatuses, and non-transitory computer-readable medium described herein, the second control signaling further includes an indication of one or more parameters for the L1 report configuration and the method, apparatuses, and non-transitory computer-readable medium may include further operations, features, means, or instructions for updating the L1 report configuration based on the one or more parameters, where the channel information may be reported via the L1 report in accordance with the updated L1 report configuration.

In some examples of the method, apparatuses, and non-transitory computer-readable medium described herein, the one or more parameters include a report configuration or a report periodicity, or both, the channel information being reported via the L1 report based on the report configuration or the report periodicity, or both.

In some examples of the method, apparatuses, and non-transitory computer-readable medium described herein, the second control signaling includes a bitmap for respective cell indices associated with each serving cell of the one or more serving cells.

Some examples of the method, apparatuses, and non-transitory computer-readable medium described herein may further include operations, features, means, or instructions for identifying, based on the L1 report configuration, a reference cell group from the one or more cell groups, the reference cell group including a threshold quantity of serving cells for channel measurement and reporting, where the second control signaling indicates one or more serving cells for the channel measurement and reporting that may have changed with respect to serving cells of the reference cell group, and where performing the one or more channel measurements includes and performing the one or more channel measurements for the one or more serving cells based on the second control signaling, where the L1 report includes channel information for the one or more serving cells in accordance with the second control signaling.

Some examples of the method, apparatuses, and non-transitory computer-readable medium described herein may further include operations, features, means, or instructions for receiving, within the first control signaling, an indication of the reference cell group, where the reference cell group may be identified based on the first control signaling.

In some examples of the method, apparatuses, and non-transitory computer-readable medium described herein, the reference cell group includes a predefined set of serving cells.

In some examples of the method, apparatuses, and non-transitory computer-readable medium described herein, the reference cell group includes a set of one or more serving cells included in a prior L1 report.

In some examples of the method, apparatuses, and non-transitory computer-readable medium described herein, performing the one or more channel measurements may include operations, features, means, or instructions for performing the one or more channel measurements for the subset of serving cells based on the second control signaling, where the L1 report includes channel information for the subset of serving cells in accordance with the second control signaling.

In some examples of the method, apparatuses, and non-transitory computer-readable medium described herein, respective subsets of serving cells of the set of multiple subsets of serving cells may be based on a cell location, a cell status, or any combination thereof.

Some examples of the method, apparatuses, and non-transitory computer-readable medium described herein may further include operations, features, means, or instructions for maintaining the updated L1 report configuration for transmitting one or more L1 reports until additional control signaling may be received.

Some examples of the method, apparatuses, and non-transitory computer-readable medium described herein may further include operations, features, means, or instructions for maintaining the updated L1 report configuration for transmitting one or more L1 reports based on a time duration or a quantity of L1 reports, or both.

In some examples of the method, apparatuses, and non-transitory computer-readable medium described herein, updating the L1 report may include operations, features, means, or instructions for updating the L1 report configuration after a time duration, the time duration being based on receiving the second control signaling, an acknowledgment associated with the second control signaling, a configured timer associated with receiving the second control signaling, or any combination thereof.

In some examples of the method, apparatuses, and non-transitory computer-readable medium described herein, performing the one or more channel measurements may include operations, features, means, or instructions for performing a first set of channel measurements for the first cell group based on the first L1 report configuration and performing a second set of channel measurements for the second cell group based on the second L1 report configuration, where the L1 report includes channel information associated with the first cell group and the second cell group based on the first set of channel measurements and the second set of channel measurements, the L1 report being transmitted in accordance with the first L1 report configuration and the second L1 report configuration.

In some examples of the method, apparatuses, and non-transitory computer-readable medium described herein, the first cell group of the one or more cell groups includes the active serving cells and the second cell group of the one or more cell groups includes the inactive serving cells.

In some examples of the method, apparatuses, and non-transitory computer-readable medium described herein, the one or more cell groups may be based on at least one of an activation status and a candidate cell set for the inter-cell mobility procedures.

In some examples of the method, apparatuses, and non-transitory computer-readable medium described herein, a first cell group of the one or more cell groups includes the active serving cells and a second cell group of the one or more cell groups includes the inactive serving cells.

In some examples of the method, apparatuses, and non-transitory computer-readable medium described herein, the first control signaling further indicates a set of L1 report configurations associated with the inactive serving cells.

In some examples of the method, apparatuses, and non-transitory computer-readable medium described herein, the L1 report configuration indicates the one or more channel measurements to be performed by the UE, one or more quantities associated with the one or more channel measurements to be included in the L1 report, one or more physical cell identifiers associated with the one or more cell groups, or a combination thereof.

In some examples of the method, apparatuses, and non-transitory computer-readable medium described herein, the one or more quantities associated with the one or more channel measurements include a first channel measurement value associated with a first cell of the one or more cell groups and a first differential value with respect to the first channel measurement value and associated with a second cell of the one or more cell groups.

A method for wireless communications at a network entity is described. The method may include transmitting first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures and receiving an L1 report including channel information for the one or more cell groups based on one or more channel measurements, the L1 report being received in accordance with the L1 report configuration.

An apparatus for wireless communications at a network entity is described. The apparatus may include a processor, memory coupled with the processor, and instructions stored in the memory. The instructions may be executable by the processor to cause the apparatus to transmit first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures and receive an L1 report including channel information for the one or more cell groups based on one or more channel measurements, the L1 report being received in accordance with the L1 report configuration.

Another apparatus for wireless communications at a network entity is described. The apparatus may include means for transmitting first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures and means for receiving an L1 report including channel information for the one or more cell groups based on one or more channel measurements, the L1 report being received in accordance with the L1 report configuration.

A non-transitory computer-readable medium storing code for wireless communications at a network entity is described. The code may include instructions executable by a processor to transmit first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures and receive an L1 report including channel information for the one or more cell groups based on one or more channel measurements, the L1 report being received in accordance with the L1 report configuration.

Some examples of the method, apparatuses, and non-transitory computer-readable medium described herein may further include operations, features, means, or instructions for transmitting second control signaling indicating a second reporting format for the L1 report that may be modified with respect to a first reporting format indicated by the first control signaling, where the received L1 report corresponds to an updated L1 report configuration based on the second reporting format.

In some examples of the method, apparatuses, and non-transitory computer-readable medium described herein, the second control signaling indicates one or more serving cells from the one or more cell groups for channel measurement and reporting and the L1 report includes channel information for the one or more serving cells in accordance with the second control signaling.

In some examples of the method, apparatuses, and non-transitory computer-readable medium described herein, the second control signaling further includes an indication of one or more parameters for the L1 report configuration and the L1 report configuration may be updated based on the one or more parameters, the channel information being reported via the L1 report in accordance with the updated L1 report configuration.

In some examples of the method, apparatuses, and non-transitory computer-readable medium described herein, the one or more parameters include a report configuration or a report periodicity, or both, the channel information being reported via the L1 report based on the report configuration or the report periodicity, or both.

In some examples of the method, apparatuses, and non-transitory computer-readable medium described herein, the second control signaling includes a bitmap for respective cell indices associated with each serving cell of the one or more serving cells.

Some examples of the method, apparatuses, and non-transitory computer-readable medium described herein may further include operations, features, means, or instructions for selecting a reference cell group from the one or more cell groups, the reference cell group including a threshold quantity of serving cells for channel measurement and reporting, where the second control signaling indicates one or more serving cells for the channel measurement and reporting that may have changed with respect to serving cells of the reference cell group, and where the L1 report includes channel information for the one or more serving cells in accordance with the second control signaling.

Some examples of the method, apparatuses, and non-transitory computer-readable medium described herein may further include operations, features, means, or instructions for transmitting, within the first control signaling, an indication of the reference cell group, where the reference cell group may be identified based on the first control signaling.

In some examples of the method, apparatuses, and non-transitory computer-readable medium described herein, the reference cell group includes a predefined set of serving cells.

In some examples of the method, apparatuses, and non-transitory computer-readable medium described herein, the reference cell group includes a set of one or more serving cells included in a prior L1 report.

In some examples of the method, apparatuses, and non-transitory computer-readable medium described herein, the second control signaling indicates a subset of serving cells from the one or more cell groups for channel measurement and reporting, the subset of serving cells selected from a set of multiple subsets of serving cells and the L1 report includes channel information for the subset of serving cells in accordance with the second control signaling.

In some examples of the method, apparatuses, and non-transitory computer-readable medium described herein, respective subsets of serving cells of the set of multiple subsets of serving cells may be based on a cell location, a cell status, or any combination thereof.

In some examples of the method, apparatuses, and non-transitory computer-readable medium described herein, a first cell group of the one or more cell groups may be associated with a first L1 report configuration for reporting measurements associated with the first cell group, and a second cell group of the one or more cell groups may be associated with a second L1 report configuration for reporting measurements associated with the second cell group and the L1 report includes channel information associated with the first cell group and the second cell group based on the first set of channel measurements and the second set of channel measurements, the L1 report being transmitted in accordance with the first L1 report configuration and the second L1 report configuration.

In some examples of the method, apparatuses, and non-transitory computer-readable medium described herein, the first cell group of the one or more cell groups includes the active serving cells and the second cell group of the one or more cell groups includes the inactive serving cells.

In some examples of the method, apparatuses, and non-transitory computer-readable medium described herein, the one or more cell groups may be based on at least one of an activation status and a candidate cell set for the inter-cell mobility procedures.

In some examples of the method, apparatuses, and non-transitory computer-readable medium described herein, a first cell group of the one or more cell groups includes the active serving cells and a second cell group of the one or more cell groups includes the inactive serving cells.

In some examples of the method, apparatuses, and non-transitory computer-readable medium described herein, the first control signaling further indicates a set of L1 report configurations associated with the inactive serving cells.

In some examples of the method, apparatuses, and non-transitory computer-readable medium described herein, the L1 report configuration indicates the one or more channel measurements to be performed by the UE, one or more quantities associated with the one or more channel measurements to be included in the L1 report, one or more physical cell identifiers associated with the one or more cell groups, or a combination thereof.

In some examples of the method, apparatuses, and non-transitory computer-readable medium described herein, the one or more quantities associated with the one or more channel measurements include a first channel measurement value associated with a first cell of the one or more cell groups and a first differential value with respect to the first channel measurement value and associated with a second cell of the one or more cell groups.

BRIEF DESCRIPTION OF THE DRAWINGS

FIGS. 3A and 3B illustrate examples of report configurations that support dynamic reporting techniques for inter-cell mobility in accordance with one or more aspects of the present disclosure.

FIG. 6 illustrates an example of a set of report configurations that supports dynamic reporting techniques for inter-cell mobility in accordance with one or more aspects of the present disclosure.

DETAILED DESCRIPTION

Figure 1:
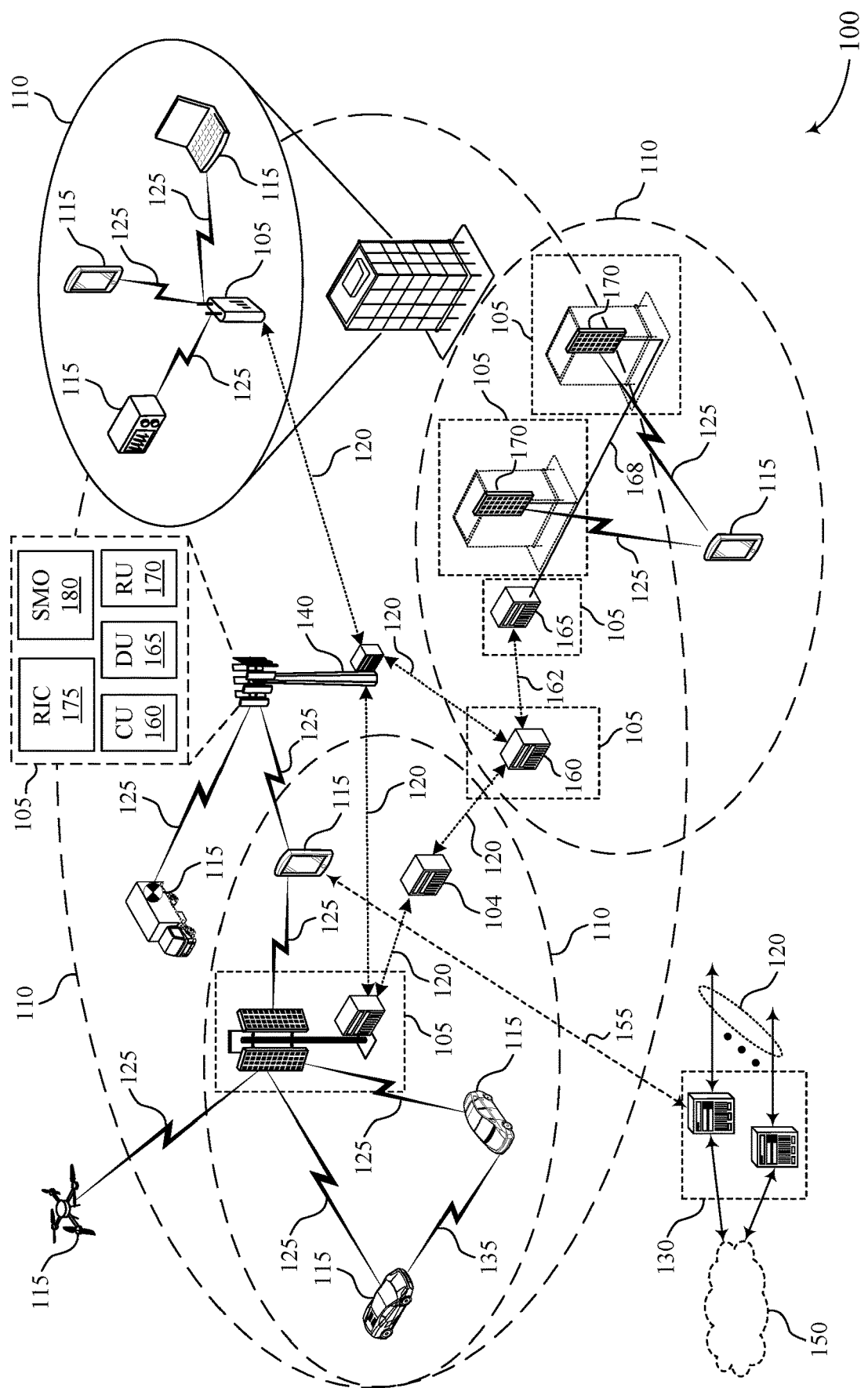
FIG. 1 illustrates an example of a wireless communications system that supports dynamic reporting techniques for inter-cell mobility in accordance with one or more aspects of the present disclosure.

In some wireless communications systems, a UE may establish a connection with one or more cells that are activated for communication with the UE. If channel conditions change (due to the UE moving farther away from a cell, signal obstruction, or environmental factors), the UE may perform a handover to a different cell (e.g., to a cell that provides relatively improved coverage for the UE). For example, a UE may perform a handover procedure if channel conditions on a neighbor cell are more favorable than channel conditions on a serving cell of the UE. In some cases, a wireless communications system may support lower-layer (e.g., layer one (L1) or layer two (L2)) handovers. For example, the UE may establish a communication link with a network via one or multiple cells of a set of cells configured for the UE by the network. In such cases, the set of cells may be configured for L1 and/or L2 (L1/L2) mobility, such that the UE or the network may activate or deactivate cells of the configured set of cells via L1/L2 signaling. Further, a network entity may use L1/L2 signaling to trigger a handover at the UE from one cell of the configured set of cells to another. The use of L1/L2 signaling to facilitate handovers across cells may be referred to as L1/L2 mobility, and may reduce latency associated with performing a handover, beam management, cell activation or deactivation, or other mobility procedures for the UE (e.g., as compared to handover procedures using higher-layer signaling).

As part of a mobility procedure involving cells of the configured set of cells (such as maintenance of the activated set of cells), the UE may measure a channel quality between the UE and one or more active cells of the configured set of cells and may transmit one or more measurement reports to a network entity based on the measurements. For example, the UE may report channel measurements for active cells (e.g., serving cells) of the configured set of cells, and a handover procedure may be triggered based on the measurement report(s), e.g., between active cells of the configured set of cells. Some wireless communications systems, however, may only support channel measurements and reporting for active cells of the configured set of cells, such that the UE refrains from measuring or reporting channel information associated with inactive cells of the configured set of cells. In such cases, the UE and the network entity may not have channel information about the inactive cells. As such, the UE and the network entity may be unaware if any of the inactive cells are able to provide relatively better channel quality than an active cell. Additionally, if the UE is to perform handover to an inactive cell, the UE may first obtain and report measurements for the inactive cell, which may result in relatively higher latency (e.g., compared to handover between active cells for which the UE has already obtained measurements).

The present disclosure provides techniques for facilitating channel measurement and reporting for inactive cells of a set of serving cells configured for inter-cell mobility (e.g., L1/L2 mobility). In particular, a UE may receive control signaling (e.g., radio resource control (RRC) signaling) indicating an L1 report configuration for reporting measurements associated with one or more cell groups of the configured set of serving cells, where the one or more cell groups include both active serving cells and inactive serving cells of the configured set of serving cells. The L1 report configuration may enable the UE to perform channel measurements and transmit an L1 report indicating associated channel information for both active and inactive cells of the configured set of serving cells.

The techniques described herein further support dynamic updating of the L1 report configuration. The UE may receive additional control signaling (e.g., L1/L2 control signaling, such as a media access control (MAC) control element (MAC-CE), downlink control information (DCI), or the like) indicating one or more parameters of the report configuration to be updated. For example, the additional control signaling may indicate one or more cells for which the UE is to transmit an L1 report, one or more quantities to include in an L1 report, a periodicity of the L1 report, or the like, among other examples. The UE may update the L1 report configuration based on the additional control signaling and may perform channel measurements and transmit L1 reports in accordance with the updated L1 report configuration.

Particular implementations of the present disclosure can be implemented to realize one or more of the following potential advantages. For example, enabling reporting configurations for inactive cells may support seamless mobility among all configured cells of a set of cells, e.g., even among inactive cells. By determining and maintaining channel information associated with inactive cells in addition to active cells, the UE may perform handover procedures with increased efficiency and reduced latency. Improved handover procedures may support improved performance for highly-mobile UEs, such as vehicle UEs, that move between cells frequently or at relatively high velocities. Further, facilitating dynamic updating of the report configuration(s) may reduce latency associated with RRC signaling used to indicate the report configuration(s), which may improve communications efficiency and reduce overhead.

Aspects of the disclosure are initially described in the context of wireless communications systems. Aspects of the disclosure are then discussed with reference to report configurations and a process flow. Aspects of the disclosure are further illustrated by and described with reference to apparatus diagrams, system diagrams, and flowcharts that relate to dynamic reporting techniques for inter-cell mobility.

FIG. 1 illustrates an example of a wireless communications system 100 that supports dynamic reporting techniques for inter-cell mobility in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support dynamic reporting techniques for inter-cell mobility as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

A network entity 105 may gather channel condition information from a UE 115 to efficiently configure the channel or perform mobility-based operations, such as L1/L2 signaling-based handover procedures (e.g., for inter-cell L1/L2 mobility). This information may be sent from the UE 115 in the form of a channel state report (e.g., a channel state information (CSI) report). A CSI report may contain a rank indicator (RI) requesting a number of layers to be used for downlink transmissions (e.g., based on antenna ports of the UE 115), a precoding matrix indicator (PMI) indicating a preference for which precoder matrix should be used (e.g., based on a number of layers), and a channel quality indicator (CQI) representing a highest modulation and coding scheme (MCS) that may be used. In some cases, the RI may be associated with a number of antennas used by a device. CQI may be calculated by a UE 115 after receiving predetermined pilot symbols such as cell-specific reference signals (CRS) or CSI-RS. RI and PMI may be excluded if the UE 115 does not support spatial multiplexing (or is not in a supported spatial mode). In some examples, the types of information included in the CSI report determines a reporting type. Channel state reports may be periodic or aperiodic. Further, channel state reports may have different types based on a codebook used to generate the report. For instance, a Type I CSI report may be based on a first codebook and a Type II CSI report may be based on a second codebook, where the first and second codebooks may be based on different antenna configurations. In some cases, the use of either Type I or Type II CSI reports may improve MIMO performance (as compared to other types of CSI reports). In some cases, a Type II CSI report may be carried at least on a PUSCH, and may provide CSI to a network entity 105 with a relatively higher level of granularity (e.g., for MU-MIMO services).

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a CRS, a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support inter-cell mobility such that a UE 115 or a network entity 105 may initiate handover procedures to switch the UE 115 from a serving cell to a different serving cell. A UE 115 may receive control signaling (e.g., RRC signaling) indicating a set of cells configured for inter-cell mobility procedures. The UE 115 may establish a connection with one or more cells of the configured set of cells that are activated (e.g., by a network entity 105) for communication with the UE 115. If channel conditions change (due to the UE 115 moving farther away from a cell, signal obstruction, or environmental factors), the UE 115 may perform a handover to a different cell of the set of cells (such as a cell that provides better coverage to the UE 115) or may perform beam management. For example, a UE 115 may report channel information associated with a non-serving cell to a network entity 105 of the serving cell and determine to perform a handover procedure based in part on which cell has more favorable channel conditions (e.g., reference signal received power (RSRP), signal to interference plus noise ratio (SINR)).

Some mobility procedures may rely on L3 signaling, such as RRC signaling, for mobility. L3 may be referred to as an RRC layer which handles functions such as establishment, maintenance, and release of RRC connections at a cell level. L3 reporting may be performed relatively infrequently to allow a communication device (e.g., the UE 115 or the network entity 105) to track channel conditions over time for supporting inter-cell mobility and initiating handover procedures. For example, the UE 115 may measure an L3 RSRP of a non-serving cell. If the L3 RSRP of the non-serving cell is higher than an RSRP of a serving cell, the UE 115 and a network entity of the serving cell may determine to perform a handover procedure, where the UE 115 switches service to the non-serving cell. However, due to the relatively infrequent nature of L3 reporting, a determination to perform handover may be delayed or may not be fast enough to account for dynamic channel conditions experienced by the UE 115. As such, the UE 115 may operate on a serving cell with relatively poor performance before performing handover to a cell with relatively better channel quality.

Additionally, or alternatively, the wireless communications system 100 may support lower layer (e.g., L1/L2) handover procedures. For example, the UE 115 (e.g., and one or more associated network entities 105) may support performing handover procedures based on L1 and/or L2 signaling. L1 may be referred to as a physical layer which handles functions such as modulation and demodulation of physical channels (e.g., physical uplink shared channel (PUSCH), physical uplink control channel (PUCCH), etc.). L2 may be referred to as a medium access control (MAC), radio link control (RLC), or a packet data convergence protocol (PDCP) layer which handles functions such as beam management, random access procedures, mapping between logical and physical channels, etc. In some examples, L1 or L2 signaling may occur more frequently than L3 signaling. For instance, the UE 115 may perform channel measurements for cells in the configured set of cells and may report channel information via L1 signaling. The UE 115 may transmit such L1 reports relatively more frequently than L3 reports. Further, the UE 115 and/or the network entity 105 may determine to perform handover procedures based on the relatively more frequent L1 reporting. For example, based on L1 reporting, the UE 115 may identify a neighboring cell with relatively better channel quality compared to a serving cell of the UE 115 and may perform handover to the neighboring cell in a shorter time frame than if the UE 115 relied on L3 reporting. Thus, handover procedures based on L1/L2 signaling may be dynamic and exhibit a higher efficiency and reduced latency when compared to L3 handover procedures.

In some cases, a network entity 105 and a UE 115 may use L1/L2 mobility for primary cell (PCell) management and primary secondary cell (PSCell) management. The network entity 105 may transmit L3 signaling to the UE 115 indicating a set of cells activated for L1/L2 mobility. The set of cells activated for L1/L2 mobility may be referred to as an L1/L2 activated set of cells. Accordingly, the network entity 105 may use L1/L2 signaling to trigger a handover from a first cell in the L1/L2 activated set of cells to a second cell in the L1/L2 activated set of cells. For example, the network entity 105 may use L1/L2 signaling to indicate a PCell or PSCell to the UE 115, and the UE 115 may connect to the indicated PCell or PSCell.

In some cases, the wireless communications system 100 may not support L1 measurement and reporting for inactive cells of the configured set of cells. That is, the UE 115 may perform channel measurements and transmit L1 reports for active cells of the configured set of cells, but may not measure or report any cell information for inactive cells. Thus, the UE 115 may be unaware of channel conditions at inactive cells, and as a result, the UE 115 and the network entity 105 may be unaware if any of the inactive cells are able to provide better channel quality than an active cell. Additionally, in some cases, the UE 115 may perform handover to an inactive cell. For example, the UE 115 may be mobile, and may move to a location closer to a configured inactive serving cell than a current active serving cell. To perform the handover, the UE 115 may first obtain and report measurements for the inactive serving cell before connecting to the inactive serving cell, which may delay service provided to the UE 115. Accordingly, enabling the UE 115 to report measurements for inactive cells (e.g., in addition to active cells) may reduce latency and improve efficiency in inter-cell mobility procedures.

The techniques described herein support channel measurement and reporting for both inactive and active cells configured for inter-cell mobility. According to the present disclosure, the UE 115 may be configured (e.g., RRC-configured) with a first report configuration (e.g., an L1 report configuration) for reporting measurements associated with inactive and active cells of a configured set of cells. For example, the UE 115 may receive (e.g., from a network entity 105) a configuration (e.g., an L1 report configuration) for L1 measuring and reporting of downlink signals from one or more cell groups of the configured set of cells, the one or more cell groups including both active cells and inactive cells. Based on the configuration, the UE 115 may determine channel metrics to report. In some examples, the channel metrics may include an L1 RSRP, an L1 SINR, an L3 RSRP, an L3 SINR, a channel quality indicator (CQI), a precoding matrix indicator (PMI), a rank indicator (RI), a layer indicator (L1), or any combination thereof. The UE 115 may transmit an L1 report to one or multiple network entities. In some examples, the UE 115 may perform handover (e.g., an L1/L2 signaling-based handover procedure) among cells of the configured set of cells based on the L1 report.

The present disclosure further supports techniques for dynamically updating an L1 report configuration at the UE 115. The UE 115 may receive (e.g., from a network entity 105) L1/L2 signaling (e.g., MAC-CE, DCI, or other control signaling) that indicates one or more parameters of the first report configuration to be modified, such as a report periodicity. Additionally, or alternatively, the L1/L2 signaling may indicate a report format to be used by the UE 115 for subsequent L1 reports. For example, the UE 115 may receive a MAC-CE that indicates one or more cells or cell groups to add to the L1 report configuration, or channel metrics to be included in subsequent L1 reports, or the like. The UE 115 may update the L1 report configuration and may perform channel measurements and transmit L1 reports based on the updated L1 report configuration.

Figure 2:
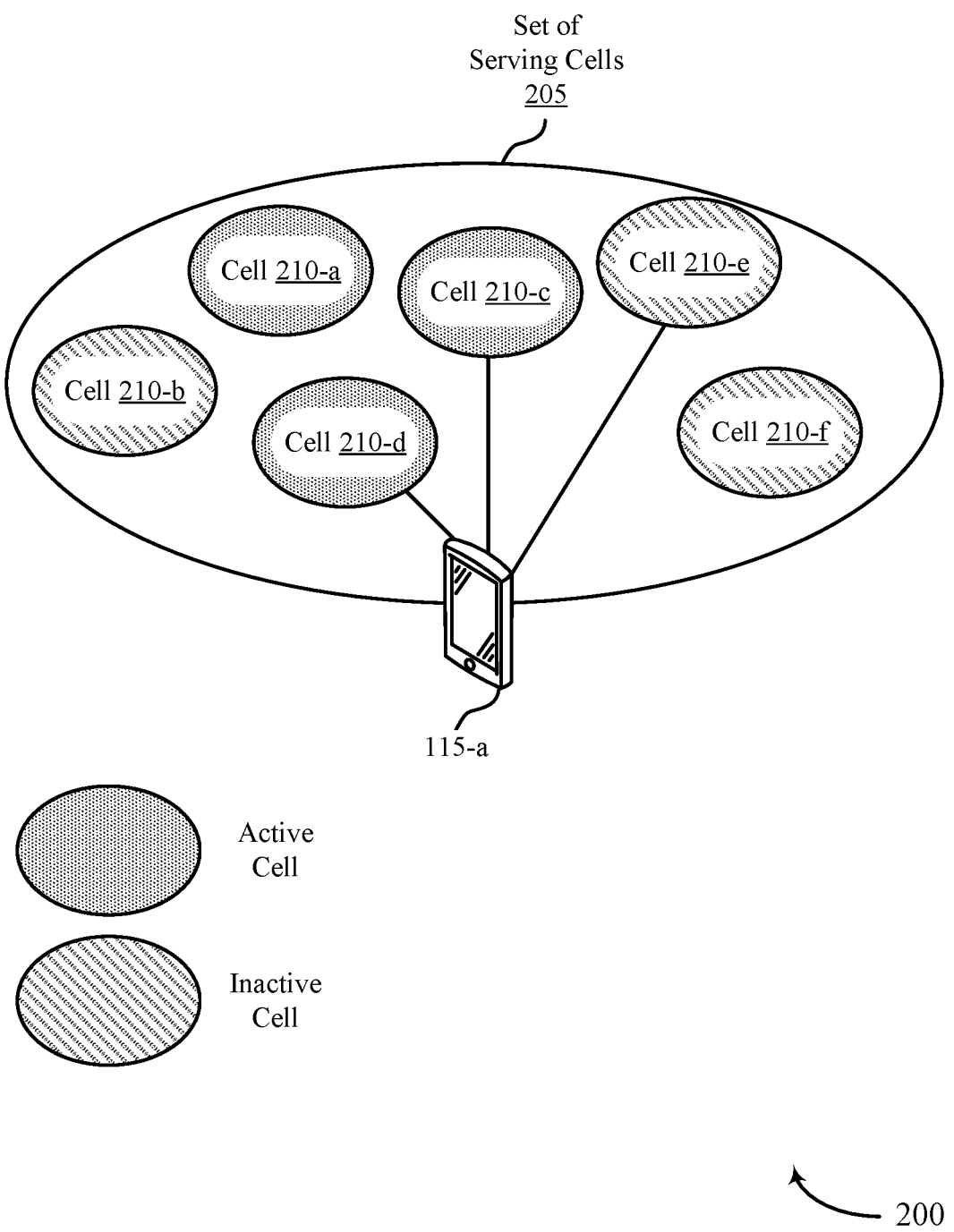
FIG. 2 illustrates an example of a wireless communications system that supports dynamic reporting techniques for inter-cell mobility in accordance with one or more aspects of the present disclosure.

FIG. 2 illustrates an example of a wireless communications system 200 that supports dynamic reporting techniques for inter-cell mobility in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a, which may be an example of a UE 115 described with reference to FIG. 1.

The wireless communications system 200 may support inter-cell mobility so that the UE 115-a may perform an L1/L2 signaling-based handover procedure to switch service from one cell to another cell. The UE 115-a may be configured with a set of serving cells 205 for inter-cell mobility procedures. The set of serving cells 205 may include a quantity of cells 210 (e.g., serving cells). Each cell 210 may be associated with a serving network entity, and in some examples, a network entity may serve multiple cells 210. The UE 115-a may communicate with a network entity of a serving cell via a communication link. Some cells 210 may be activated for communication with the UE 115-a and may be referred to as active cells 210. Active cells 210 may be used for control and data communications between the UE 115-a and one or more network entities associated with the active cells 210. That is, the UE 115-a may maintain an active communication link with one or more network entities associated with the active cells 210. As illustrated, cells 210-a, 210-c, and 210-d may be active cells 210.

Other cells 210, such as cells 210-b, 210-e, and 210-f, may be deactivated and may not be initially used for control and data communications; these cells 210 may be referred to as inactive or deactivated cells 210, and the UE 115-a may not have an active communication link with a network entity of an inactive cell 210. The cells 210 in the set of serving cells 205 may be managed by L1/L2 signaling. For example, an inactive cell 210 may be activated via L1/L2 signaling, or an active cell 210 may be deactivated via L1/L2 signaling. Each cell 210 may be identified by a respective physical cell identifier (PCID).

The UE 115-a may be configured with the set of serving cells 205 via control signaling, such as RRC signaling. For example, the UE 115-a may receive (e.g., from a network entity, such as a network entity associated with a cell 210 of the set of serving cells 205) control signaling that indicates the set of serving cells 205, e.g., via a list of PCID values (or other indications). For example, the control signaling may include an information element (e.g., an RRC information element), such as CellGroupConfig or ServingCellConfig. In some examples, the control signaling may additionally indicate which of the cells 210 are active and which are inactive. For instance, the control signaling may indicate a respective activation status (e.g., active or inactive) associated with each PCID (e.g., each cell 210).

In some examples, the control signaling may additionally indicate one or more groups of cells 210 (e.g., cell groups) of the set of serving cells 205 for which the UE 115-a is to perform L1 measurement and reporting. The indication may include or be an example of an information element (e.g., an RRC information element), such as servingCell-csiMeasEnabledForL1L2Mobility, and may include a list or set of PCIDs included in the one or more cell groups, a cell group identifier (e.g., a cell subset identifier, such as sub-setID) associated with the one or more cell groups, or a combination thereof. A cell group may include a subset of one or more cells 210 of the set of serving cells 205 and may be categorized based on an activation status, a candidate cell set, cell location, other cell characteristics, or any combination thereof. For instance, a first cell group may include one or more active cells 210, while a second cell group may include one or more inactive cells 210. Additionally, or alternatively, a cell group may include a combination of active and inactive cells 210. In some examples, a cell group may include or be an example of a candidate cell set, a reference cell group, or the like. An L1/L2 candidate cell set may refer to a group of deactivated cells 210 that may be autonomously activated by the UE 115-a. A reference cell group may refer to a threshold quantity of serving cells (e.g., cells 210) for channel measurement and reporting.

The control signaling may further indicate an L1 report configuration (e.g., CSI-reportConfig) for reporting measurements associated with one or more cell groups of the set of serving cells 205. For example, the control signaling may indicate a report configuration (e.g., an L1 report configuration) for the UE 115-a to perform L1 measurements of downlink reference signals received from one or more indicated cells 210 and to transmit one or multiple L1 reports including channel information associated with the measured reference signals (e.g., channel conditions associated with the one or more cells 210). The report configuration may indicate a reporting format that the UE 115-a is to use to transmit the L1 report, one or more reporting parameters, information to be included in the L1 report, etc.

For example, the report configuration may indicate a cell group to report, one or more cells 210 (e.g., of a cell group) to report, one or more channel measurements to be performed by the UE 115-a, one or more quantities associated with one or more channel measurements to include in an L1 report, a quantity of beams to report, a periodicity for transmitting one or more L1 reports, a trigger for transmitting an L1 reports, or a combination thereof. In some cases, the one or more quantities associated with the one or more channel measurements may include or be an example of one or more differential quantities. Here, the report configuration may indicate a first channel measurement value and one or more differential values with respect to the first channel measurement value. In some cases, the first channel measurement value may be a largest channel measurement value, e.g., the UE reports the largest measured value as the first channel measurement value, and reports the other measured values as differential values with respect to the largest measured value.

Alternatively, the first channel measurement value may be associated with an indicated cell 210, while the differential values may be associated with one or more other cells 210. For example, the report configuration may indicate that the first channel measurement value to be reported is an RSRP value associated with the cell 210-c, and that the differential values to be reported are associated with the cells 210-d and 210-e. The UE 115-a may determine RSRP values for each of the cells 210-c, 210-d, and 210-e. When generating the L1 report, the UE 115-a may include the RSRP value for the cell 210-c, as well as differential RSRP values for the cell 210-d and the cell 210-e, respectively. The differential RSRP values for the cells 210-d and 210-e may be determined with respect to the RSRP value for the cell 210-c.

In some cases, the control signaling may indicate a set of report configurations (e.g., L1 report configurations) corresponding to or otherwise associated with one or more cells 210 or one or more cell groups. For example, the control signaling may include an information element (e.g., an RRC information element), such as servingCell-csiMeasEnabledToAddModList that indicates a set of L1 report configurations (e.g., a quantity or list of CSI-MeasConfig information elements). In some examples, the control signaling may indicate a set of L1 report configurations associated with the active cells 210 of the set of serving cells 205, and the UE 115-a may utilize the set of L1 report configurations if an associated cell 210 or cell group has an active cell status. For example, the control signaling may include csi-ReportConfigToAddModList that indicates one or more L1 report configurations to be used for L1 measurement and reporting for active cells 210, csi-ReportConfigToReleaseList that indicates one or more L1 report configurations to be removed from use (e.g., the UE 115-a may refrain from using L1 report configurations indicated via csi-ReportConfigToReleaseList) for active cells 210, or both.

Additionally, or alternatively, the control signaling may indicate a set of L1 report configurations associated with the inactive cells 210 of the set of serving cells 205, and the UE 115-a may utilize the set of L1 report configurations for associated cells 210 or cell groups that are inactive. Here, the control signaling may include csi-ReportConfigDeactiveToAddModList that may indicate one or more CSI reporting configurations to be used for L1 measurement and reporting for inactive cells 210, csi-ReportConfigDeactiveToReleaseList that may indicate one or more CSI reporting configurations to be removed from use (e.g., the UE 115-a may refrain from using L1 report configurations indicated via csi-ReportConfigToReleaseList) for inactive cells 210, or both. In some cases, the control signaling may indicate a set of L1 report configurations and a corresponding cell group identifier (e.g., subsetID), such that the UE 115-a performs L1 measurement and reporting for each cell 210 in the identified cell group in accordance with the set of L1 report configurations. In some examples, the CSI-ReportConfig for one or more inactive cells in L1/L2 mobility may be different than the CSI-ReportConfig when one or more cells are active (e.g., difference reporting periodicity and offset, different reporting quantity, and the like).

In some examples, the report configuration(s) may be cell group-specific and may be based on characteristics of the cells 210 included in a cell group, such as a cell status (e.g., activation status), a cell location, or the like. For example, a first cell group may include the inactive cells 210 and may be associated with a first report configuration, while a second cell group may include the active cells 210 and may be associated with a second report configuration. The first report configuration and the second report configuration may include (e.g., be associated with) respective reporting periodicities based on the activation statuses (e.g., active, inactive) of the corresponding cell groups. That is, the UE 115-a may be configured to transmit L1 reports for the first cell group less frequently than L1 reports for the second cell group based on the first cell group including the inactive cells 210. Adaptively and dynamically configuring report configurations based on cell groups may reduce overhead and improve communications efficiency in the wireless communications system 200.

As a non-limiting example, the report configuration may indicate a cell group of the set of serving cells 205, one or more channel measurements to be performed by the UE 115-a on each cell 210 in the set of serving cells 205, and one or more quantities associated with the channel measurements that the UE 115-a is to include in an L1 report transmission. In the example of FIG. 2, the cell group may include the cell 210-c, the cell 210-d, and the cell 210-e. The UE 115-a may receive a set of downlink signals (e.g., a set of SSBs, a set of CSI-RSs, or the like) from the cells 210-c, 210-d, and 210-e, and may perform the indicated one or more channel measurements based on the downlink signals (e.g., and in accordance with the report configuration). For instance, the UE 115-a may perform channel measurements for each cell 210 of the indicated cell group. The UE 115-a may determine channel information for each of the cells 210, which may include or be an example of the one or more quantities associated with the channel measurements indicated by the report configuration, based on performing the one or more channel measurements. The one or more quantities may include or be an example of an L1 RSRP, an L1 SINR, a CQI, a PMI, an RI, an L1, or any combination thereof, among other examples. The UE 115-a may generate and transmit an L1 report including the one or more quantities.

In some aspects, the UE 115-a may receive signaling (such as L1/L2 signaling) activating or deactivating one or more reporting parameters of the report configuration. The UE 115-a may dynamically update the report configuration based on the received L1/L2 signaling. For example, the UE 115-a may receive second (e.g., additional) control signaling, such as a MAC-CE, DCI, or the like, that indicates one or more cell indices associated with one or more of the cells 210 to be included in the L1 report (e.g., to be added to the report configuration). The second control signaling may include a bitmap for the cell indices associated with each cell 210. In some cases, the second control signaling may additionally or alternatively indicate one or more cell indices of cells 210 to be removed from the L1 report configuration. In any case, the UE 115-a may update the report configuration based on the indication(s) included in the second control signaling. In the example of FIG. 2, for instance, the UE 115-a may receive second control signaling indicating that the UE 115-a is to remove the cell 210-d from the report configuration, and that the UE 115-a is to begin reporting information associated with the cell 210-b. The UE 115-a may thus refrain from performing channel measurements for the cell 210-d and may no longer include channel information for the cell 210-d in subsequent L1 reports. Instead, the UE 115-a may begin measuring downlink signals (e.g., reference signals) received from the cell 210-b, and may transmit associated channel information in a next L1 report and in accordance with the report configuration.

In some examples, the second control signaling may indicate a second reporting format modified with respect to a first reporting format associated with the report configuration. The second reporting format may include channel metrics, cells 210 or cell groups to be reported, or the like, that are different from the first reporting format. In some cases, the second control signaling may indicate modified reporting parameters, such as a report periodicity or a different report configuration. The UE 115-a may update the report configuration based on the second control signaling.

The UE 115-a may use the updated report configuration until otherwise instructed, e.g., until the UE 115-a receives further control signaling (e.g., MAC-CE, DCI) indicating additional report configuration modifications, or instructing the UE 115-a to revert to a previous report configuration (e.g., an initially-configured report configuration or a default report configuration). Alternatively, the UE 115-a may use the updated report configuration for a time duration or for a quantity of transmitted L1 reports, which may be indicated as part of the second control signaling. Here, the UE 115-*a* may return to using the previous report configuration after transmitting the quantity of L1 reports or after the time duration has passed.

In some cases, the UE 115-*a* may refrain from updating the report configuration immediately upon reception of the second control signaling. For example, the UE 115-*a* may receive the second control signaling and may wait to update the report configuration until after a time duration. The time duration may be configured (e.g., preconfigured) or may be indicated by the second control signaling, and may, in some cases, be based on or associated with a timer, e.g., the UE 115-*a* may not update the report configuration until expiry of the timer. In some examples, the time duration may correspond to an acknowledgment associated with the second control signaling. In such examples, the UE 115-*a* may update the report configuration after transmitting an acknowledgment indicating reception of the second control signaling.

In some examples, the UE 115-*a* may perform a handover procedure (e.g., an L1/L2 signaling-based handover procedure) based on channel conditions between the UE 115-*a* and one or more cells, e.g., based on the L1 report transmitted by the UE 115-*a*. For example, the UE 115-*a* may determine or otherwise identify that channel conditions at an inactive cell (e.g., for which the UE 115-*a* is configured to perform L1 measurement and reporting) may provide relatively better service for the UE 115-*a* than an active serving cell (e.g., a current active serving cell to which the UE 115-*a* is connected). The UE 115-*a* may, in some cases, autonomously activate the inactive cell and may perform handover to the newly-activated cell. As another example, the UE 115-*a* may move away from the active serving cell and closer (e.g., geographically) to the inactive cell. The UE 115-*a* may perform handover to the inactive cell based on the location of the UE 115-*a* and based on channel information obtained by the UE 115-*a* for the L1 report.

FIGS. 3A and 3B illustrate examples of report configurations 300 and 301, respectively, that supports dynamic reporting techniques for inter-cell mobility in accordance with one or more aspects of the present disclosure. The report configurations 300 and 301 may implement aspects of the wireless communications systems 100 and 200 or may be implemented by aspects of the wireless communications system 100 and 200 as described with reference to FIGS. 1 and 2. For example, a UE may be configured with a set of serving cells for inter-cell mobility procedure. The UE may receive control signaling (e.g., RRC signaling) indicating the report configurations 300 and/or 301, and may perform L1 measurement and reporting based on the report configurations 300 and 301 in accordance with the techniques described herein. The report configurations 300 and 301 may indicate reporting formats for one or more L1 reports to be transmitted by the UE.

In some cases, the UE may be configured with one or more cell groups of the set of serving cells. A cell group 305 may include all or a subset of the cells in the set of serving cells, and may be determined based on a cell location, a cell status (e.g., active or inactive), a candidate cell set, or the like. The control signaling indicating the set of serving cells and the report configurations 300 and 301 may configure or otherwise indicate the cell groups 305, e.g., via an indication of subset identifier or a cell group identifier. The UE may determine the cells included in the cell group 305 based on the subset identifier or cell group identifier. In some aspects, the control signaling may indicate the PCIDs for each individual cell included in the cell group 305.

A report configuration may be associated with all of the cells in the set of serving cells, e.g., regardless of activation status. Additionally, or alternatively, a report configuration may correspond to or be associated with one or more cell groups 305 of the configured set of serving cells, such as one or more subsets of serving cells. For example, in FIG. 3A, the report configuration 300 may be associated with a cell group 305-*a* that includes both active and inactive cells of the set of serving cells, while in FIG. 3B, the report configuration 301 may be associated with a cell group 305-*b* corresponding to active cells of the set of serving cells and a cell group 305-*c* corresponding to inactive cells of the set of serving cells.

The report configurations 300 and 301 may thus indicate cells or cell groups 305 for which the UE is to include reporting quantities in an L1 report. Each cell in the set of serving cells may be associated with an identifier, such as a PCID, and the report configurations 300 and 301 may indicate the cells to be reported by, for example, indicating corresponding PCIDs, indicating a bitmap for respective cell indices associated with each cell, or the like. In FIG. 3A, the report configuration 300 may indicate a PCID 0 corresponding to a first cell, a PCID 1 corresponding to a second cell, a PCID 2 corresponding to a third cell, and a PCID 3 corresponding to a fourth cell. The second cell may be an example of an inactive serving cell, while the first, third, and fourth cells may be examples of active serving cells.

The report configurations 300 and 301 may further indicate one or more report quantities associated with each cell (e.g., associated with each PCID) to be included in the L1 report, such as one or more beams, one or more channel metrics (e.g., quantities associated with one or more channel measurements), one or more differential values across the PCIDs, a reporting frequency for transmission of the L1 report, measurement reference signal information, a quantity of beams to report, or a combination thereof. In some examples, each cell indicated by the report configurations 300 and 301 may be associated with a report configuration that indicates the content and reporting parameters of the L1 report to be transmitted by the UE for the cell. Here, the report configurations 300 and 301 may be understood as including a set of report configurations. In some examples, the report configurations may be the same for each cell, or each cell may be associated with a cell-specific report configuration.

The report configuration 300 may indicate that the UE is to report an L1 RSRP associated with each cell of the cell group 305-*a*. Based on the report configuration 300, the UE may perform channel measurements for each of the cells in the cell group 305-*a*, for example, based on receiving respective downlink signals (e.g., reference signals) from each cell. The UE may determine or otherwise identify channel information corresponding to the indicated reporting quantities based on the channel measurements to include in the L1 report. As illustrated, the UE may transmit an L1 report in accordance with the report configuration 300, the L1 report indicating an L1 RSRP value for the first cell, an L1 RSRP value for the second cell, an L1 RSRP value for the third cell, and an L1 RSRP value for the fourth cell.

In some examples, the UE may be configured with a report configuration or reporting format per cell group 305, which may be based on the cells included in the cell group 305. In the example of FIG. 3B, the cell group 305-*b* may include the three active cells (e.g., cells corresponding to PCID 0, PCID 2, PCID 3) of the set of serving cells, while the cell group 305-*c* may include the inactive cell (e.g., corresponding to PCID 1) of the set of serving cells. The report configuration 301 may indicate a reporting format for the cell group 305-*b* based on the cell group 305-*b* including the active cells and a reporting format for the cell group 305-*c* based on the cell group 305-*c* including the inactive cell. In some cases, the report configuration 301 may further indicate one or more reporting parameters associated with each cell group 305-*b* and 305-*c*.

The UE may transmit one or more L1 reports in accordance with the report configuration 301. In a first example, the UE may transmit a first L1 report at a first periodicity and indicating respective L1 RSRP values for each cell in the cell group 305-*b*, e.g., for the active cells of the set of serving cells. The UE may transmit a second L1 report at a second periodicity indicating an L1 RSRP value for the cell in the cell group 305-*c*, e.g., for the inactive cell of the set of serving cells; the periodicities may be such that the UE transmits the second L1 report less frequently than the first L1 report. In a second example, the UE may transmit one L1 report that includes the L1 RSRP values for both of the cell groups 305-*b* and 305-*c*.

Figure 4:
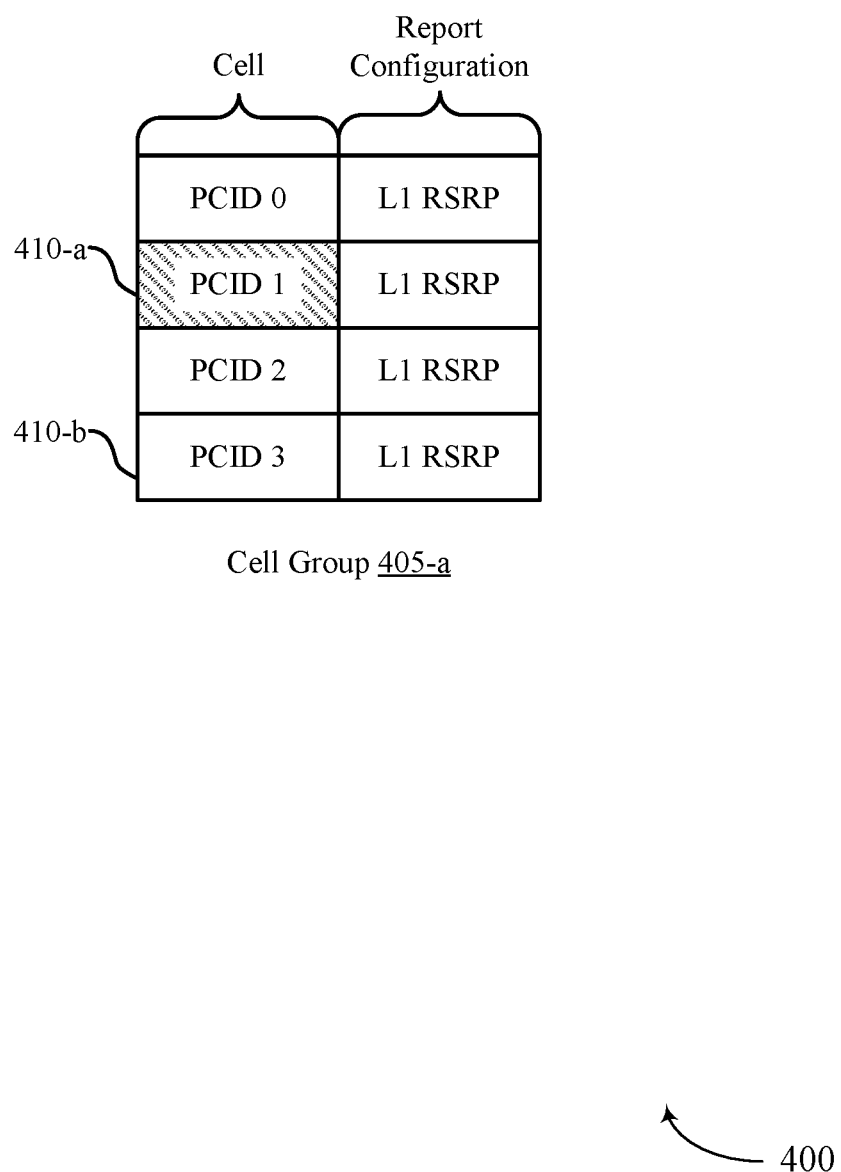
FIG. 4 illustrates an example of a report configuration that supports dynamic reporting techniques for inter-cell mobility in accordance with one or more aspects of the present disclosure.

FIG. 4 illustrates an example of a report configuration 400 that supports dynamic reporting techniques for inter-cell mobility in accordance with one or more aspects of the present disclosure. The report configuration 400 may implement aspects of the wireless communications systems 100 and 200 or may be implemented by aspects of the wireless communications system 100 and 200 as described with reference to FIGS. 1 and 2. For example, a UE may receive control signaling indicating a set of serving cells and the report configuration 400. The report configuration 400 may indicate that the UE is to report L1 RSRP values for cells of a cell group 405-*a*, including a first cell (e.g., PCID 0), a second cell (e.g., PCID 1), a third cell (e.g., PCID 2), and a fourth cell (e.g., PCID 3). The second cell may be inactive, while the first, third, and fourth cells may be active. The UE may perform L1 channel measurement and reporting based on the report configuration 400 in accordance with the techniques described herein.

The report configuration 400 may further indicate one or more report quantities associated with each cell (e.g., associated with each PCID) to be included in the L1 report, such as one or more beams, one or more channel metrics (e.g., quantities associated with one or more channel measurements), one or more differential values across the PCIDs, a reporting frequency for transmission of the L1 report, measurement reference signal information, a quantity of beams to report, or a combination thereof. In some examples, each cell indicated by the report configuration 400 may be associated with a report configuration that indicates the content and reporting parameters of the L1 report to be transmitted by the UE for the cell. Here, the report configuration 400 may be understood as including a set of report configurations. In some examples, the report configurations may be the same for each cell, or each cell may be associated with a cell-specific report configuration.

In the example of FIG. 4, the UE may receive additional control signaling (e.g., second control signaling) to dynamically update the report configuration 400. For example, the UE may receive first control signaling indicating the report configuration 400 and the cell group 405-*a*. The UE may receive second control signaling, such as L1/L2 signaling (e.g., DCI, MAC-CE), that indicates a subset of cells selected from the cell group 405-*a* for channel measurement and reporting. The subset of cells may be based on a cell status, a cell location, etc. In some examples, the second control signaling may include a bitmap for respective cell indices associated with the indicated subset of cells. As illustrated, the second control signaling may include an indication 410-*a* corresponding to the PCID 1 (e.g., indicating the second cell) and an indication 410-*b* corresponding to the PCID 3 (e.g., indicating the fourth cell). In some examples, the second control signaling may additionally or alternatively indicate one or more report configurations, reporting formats, or reporting periodicity associated with the indicated subset of cells. For example, the second control signaling may indicate a reporting configuration to use for one or more cells of the indicated subset of cells.

The UE may update the report configuration 400 based on the second control signaling. Updating the report configuration 400 may involve removing one or more report configurations from a set of report configurations, modifying one or more reporting parameters, modifying a reporting format associated with the report configuration 400, or a combination thereof, e.g., based on the indication(s) included in the second control signaling. For example, the UE may remove the report configurations associated with the first cell and the third cell of the cell group 405-*a* based on the indicated subset of cells.

In some cases, the UE may maintain the updated report configuration 400 (e.g., may transmit one or more L1 reports in accordance with the updated report configuration 400) for a time duration, a quantity of transmitted L1 reports, or both, after which the UE may return to using the initially-configured report configuration 400. In other cases, the UE may maintain the updated report configuration 400 until the UE receives additional control signaling.

Dynamically updating the report configuration 400 via the second control signaling may reduce latency and signaling overhead, e.g., compared to report configurations received via RRC. Further, receiving L1/L2 signaling to update the report configuration 400 may enable the UE to adapt to changes in cell statuses for the set of serving cells. As cells are activated or deactivated, the UE may adaptively modify the report configuration 400, such that the UE may avoid extraneous reporting (e.g., for deactivated cells) and may maintain current channel information to be used in handover procedures among the set of serving cells.

Figure 5:
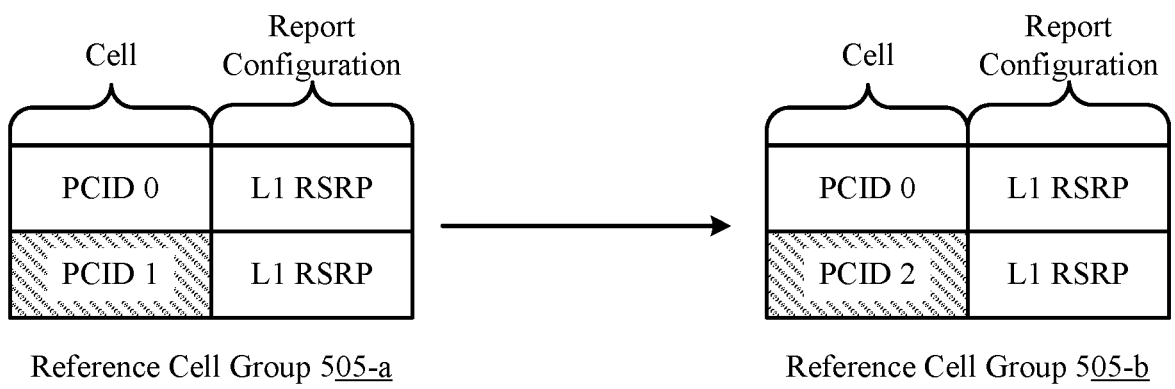
FIG. 5 illustrates an example of a reference cell report configuration that supports dynamic reporting techniques for inter-cell mobility in accordance with one or more aspects of the present disclosure.

FIG. 5 illustrates an example of a reference cell report configuration 500 that supports dynamic reporting techniques for inter-cell mobility in accordance with one or more aspects of the present disclosure. The reference cell report configuration 500 may implement aspects of the wireless communications systems 100 and 200 or may be implemented by aspects of the wireless communications system 100 and 200 as described with reference to FIGS. 1 and 2. For example, a UE may receive control signaling indicating the reference cell report configuration 500, and may perform L1 measurement and reporting based on the reference cell report configuration 500 in accordance with the techniques described herein.

In the example of FIG. 5, the UE may be configured with a reference cell group 505-*a* including a threshold quantity (e.g., a maximum quantity) of serving cells of for channel measurement and reporting. The reference cell group 505-*a* may, in some cases, be a subset of serving cells with which the UE is configured for inter-cell mobility procedures. Cells included in the reference cell group 505-*a* may be indicated (e.g., via PCIDs) in the control signaling, may be a predefined or default set of serving cells, or may include a set of one or more serving cells that was included in a previous L1 report. The reference cell group 505-*a* may include a first cell (e.g., PCID 0) that is activated and a second cell (e.g., PCID 1) that is deactivated. The reference cell report configuration 500 may indicate that the UE is to transmit an L1 report indicating an L1 RSRP value for the first cell and an L1 RSRP value for the second cell.

The UE may receive second control signaling that indicates a change in the reference cell group 505-*a*. For example, the UE may receive L1/L2 control signaling (e.g., MAC-CE, DCI) that indicates one or more serving cells that have changed with respect to the serving cells of the reference cell group 505-*a*. As illustrated, the second control signaling may indicate that the second cell of the reference cell group 505-*a* is to be replaced with a third cell (e.g., PCID 2). The UE may update the reference cell report configuration 500 to a reference cell group 505-*b* including the first cell and the third cell based on the second control signaling. The UE may perform L1 measurement and reporting for the reference cell group 505-*b* based on the updated reference cell report configuration 500.

FIG. 6 illustrates an example of a set of report configurations 600 that supports dynamic reporting techniques for inter-cell mobility in accordance with one or more aspects of the present disclosure. The set of report configurations 600 may implement aspects of the wireless communications systems 100 and 200 or may be implemented by aspects of the wireless communications system 100 and 200 as described with reference to FIGS. 1 and 2. For example, a UE may receive control signaling indicating the set of report configurations 600, and may perform L1 measurement and reporting based on the set of report configurations 600 in accordance with the techniques described herein.

The set of report configurations 600 may include a first report configuration for a first cell group 605-*a* (e.g., a first subset), a second report configuration for a second cell group 605-*b* (e.g., a second subset), and a third report configuration for a third cell group 605-*c* (e.g., a third subset). In some examples, each cell (e.g., of a cell group 605) indicated by a report configuration may be associated with a cell-specific report configuration that indicates the content and reporting parameters of the L1 report to be transmitted by the UE for the cell. Each cell group 605 may include a subset of serving cells of a set of serving cells configured for inter-cell mobility procedures at the UE, for example, based on cell statuses, a candidate cell set, cell locations, or a combination thereof. Each report configuration may indicate (e.g., via associated PCIDs) serving cells included in the respective cell group 605 and reporting quantities, report parameters, report configurations, or the like, associated with each serving cell.

In some examples, the UE may receive the control signaling indicating the set of report configurations 600 and may receive second control signaling indicating a report configuration from the set of report configurations 600 to use for L1 measurement and reporting. For example, the UE may receive L1/L2 signaling (e.g., MAC-CE, DCI) that indicates the second report configuration associated with the second cell group 605-*b*. That is, the UE may receive the L1/L2 signaling that selects the cells in the second cell group 605-*b*. The UE may perform channel measurements and transmit L1 reports in accordance with the second report configuration. In some cases, the UE may maintain or otherwise store the first report configuration and the third report configuration. In such cases, the UE may receive additional control signaling indicating a different report configuration of the set of report configurations 600 to begin using for L1 reporting. For example, the UE may receive third control signaling indicating the third report configuration, and the UE may switch to the third report configuration for generating and transmitting subsequent L1 reports.

Figure 7:
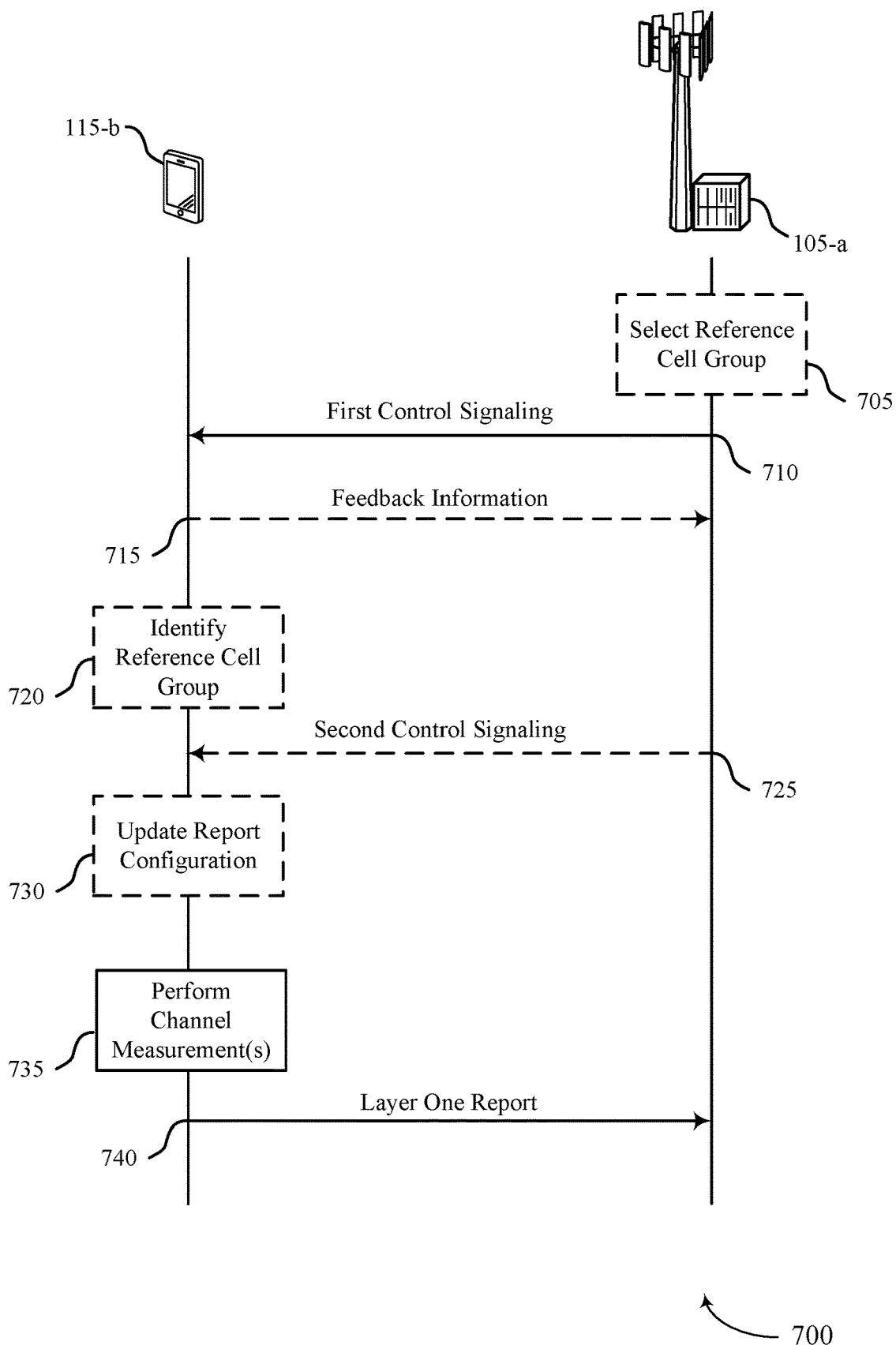
FIG. 7 illustrates an example of a process flow in a system that supports dynamic reporting techniques for inter-cell mobility in accordance with one or more aspects of the present disclosure.

FIG. 7 illustrates an example of a process flow 700 in a system that supports dynamic reporting techniques for inter-cell mobility in accordance with one or more aspects of the present disclosure. The process flow 700 may implement aspects of the wireless communications systems 100 and 200 or may be implemented by aspects of the wireless communications system 100 and 200 as described with reference to FIGS. 1 and 2. The process flow 700 may include a network entity 105-*a* and a UE 115-*b*, which may be examples of the corresponding devices described herein. In the following description of the process flow 700, the operations between the network entity 105-*a* and the UE 115-*b* may be transmitted in a different order than the example order shown, or the operations performed by the network entity 105-*a* and the UE 115-*b* may be performed in different orders or at different times. Some operations may also be omitted from the process flow 700, and other operations may be added to the process flow 700.

In the example of FIG. 7, the network entity 105-*a* may be associated with one or more serving cells of the UE 115-*b*. The network entity 105-*a* and the UE 115-*b* may support inter-cell mobility (e.g., L1/L2 mobility), such that the UE 115-*b* may be configured with a set of cells (e.g., for inter-cell mobility procedures, such as handover) and may perform handover between cells of the set of cells. The UE 115-*b* may be further configured with one or more cell groups of the set of cells; the one or more cell groups may be based on an activation status, a candidate cell set for the inter-cell mobility procedures, or the like. The one or more cell groups may include both active serving cells and inactive serving cells.

At 705, the network entity 105-*a* may select a reference cell group from the one or more cell groups that includes a quantity (e.g., a threshold quantity) of serving cells for channel measurement and reporting.

At 710, the network entity 105-*a* may transmit, and the UE 115-*b* may receive, first control signaling. The first control signaling may indicate, to the UE 115-*b*, a configuration of the set of serving cells. The first control signaling may further indicate an L1 report configuration for reporting measurements associated with the one or more cell groups. The L1 report configuration may be for L1 measuring and reporting of channel information associated with downlink reference signals from cells in the one or more cell groups. In some cases, the first control signaling may indicate a first report format for the L1 report configuration. For example, the L1 report configuration may include indications of channel metrics the UE 115-*b* is to measure and report, such as one or more channel measurements to be performed by the UE 115-*b*, one or more quantities (e.g., associated with the one or more channel measurements) to be included in an L1 report, or the like. In some cases, the one or more quantities may include one or more measurement values and one or more differential values with respect to the one or more measurement values. In some examples, the first control signaling may indicate a subset of the set of serving cells for which the UE 115-*b* is to perform L1 measurement and reporting, e.g., according to the indicated L1 report configuration.

In some examples, the first control signaling may indicate multiple (e.g., a set of) L1 report configurations. For example, the first control signaling may indicate one or more L1 report configurations associated with active cells of the set of serving cells, one or more L1 report configuration associated with inactive cells of the set of serving cells, one or more L1 report configurations to be removed from a list of L1 report configurations, or a combination thereof. As another example, the first control signaling may indicate a set of L1 report configurations including at least a first L1 report configuration for reporting measurements associated with a first cell group of the one or more cell groups and a second L1 report configuration for reporting measurements associated with a second cell group of the one or more cell groups. In some cases, the first cell group may include active cells of the set of serving cells and the second group may include inactive cells of the set of serving cells.

In some cases, the UE 115-*b* may receive, within the first control signaling, an indication of the one or more cell groups. For example, the first control signaling may indicate one or more subset identifiers corresponding to the one or more cell groups, one or more PCIDs or cell indices included in a cell group, or the like. In some examples, the first control signaling may indicate the reference cell group (e.g., selected at 705).

In some examples, at 715, based on receiving the first control signaling at 710, the UE 115-*b* may transmit feedback information (e.g., hybrid automatic repeat request (HARQ) feedback information) for the first control signaling to the network entity 105-*a*. For example, the UE 115-*a* may transmit an acknowledgment (e.g., a positive acknowledgment (ACK), a negative acknowledgment NACK) to the network entity 105-*a* indicating whether the UE 115-*a* successfully received the first control signaling.

At 720, the UE 115-*b* may optionally identify the reference cell group. For example, if the UE 115-*b* receives an indication of the reference cell group in the first control signaling (e.g., at 710), the UE 115-*b* may identify the reference cell group based on the first control signaling. In some cases, the reference cell group may be a predefined set of serving cells (e.g., of the configured set of cells for the inter-cell mobility procedures) and the UE 115-*b* may identify the reference cell group based on the predefined set of serving cells. In other cases, the reference cell group may include a set of one or more serving cells included in a previous L1 report. Here, the UE 115-*b* may identify the reference cell group by identifying a set of serving cells for which the UE 115-*b* has previously transmitted an L1 report.

At 725, the network entity 105-*a* may optionally transmit, and the UE 115-*b* may receive, second control signaling. The second control signaling may indicate a second reporting format for the L1 report that is modified with respect to the first reporting format. In some cases, the second control signaling may further indicate one or more serving cells from the one or more cell groups for which the UE 115-*b* is to perform channel measurement and reporting. For example, the second control signaling may indicate a subset of serving cells selected from multiple subsets of serving cells, e.g., based on respective cell locations, cell statuses, or a combination thereof. The second control signaling may include a bitmap corresponding to cell indices associated with each of the one or more serving cells, a subset identifier corresponding to the subset of serving cells, or the like. Additionally, or alternatively, the second control signaling may indicate one or more parameters for the L1 report configuration, such as a report configuration, a report periodicity, or the like.

In some examples, the second control signaling may indicate a change in the reference cell group. For example, the second control signaling may indicate one or more PCIDs associated with one or more serving cells to be removed from the reference cell group, one or more PCIDs associated with one or more serving cells to be added to the reference cell group, or both.

At 730, if the UE 115-*b* received second control signaling at 725, the UE 115-*b* may update the L1 report configuration based on the second control signaling, e.g., based on the indications included in the second control signaling. For example, the UE 115-*b* may update one or more reporting parameters of the L1 report configuration, a reporting format of the report configuration, one or more serving cells, cell groups, or subsets of serving cells to be reported, or a combination thereof. In some examples, the UE 115-*b* may update the L1 report configuration after a time duration associated with receiving the second control signaling. For instance, the UE 115-*b* may update the L1 report configuration after expiry of a timer associated with receiving the second control signaling, or after transmitting an acknowledgment (e.g., to the network entity 105-*a*) associated with receiving the second control signaling.

At 735, the UE 115-*b* may perform channel measurements for the one or more cell groups based on the L1 report configuration. In some cases, the UE 115-*b* may perform a first set of channel measurements for the first cell group based on the first L1 report configuration and a second set of channel measurements for the second cell group based on the second L1 report configuration, e.g., in accordance with the first control signaling.

If the UE 115-*b* received, at 725, the second control signaling, the UE 115-*b* may perform the channel measurements at 735 in accordance with the updated report configuration. For example, the UE 115-*b* may perform channel measurements for serving cells indicated by the second control signaling.

At 740, the UE 115-*b* may transmit, and the network entity 105-*a* may receive, the L1 report including channel information in accordance with the L1 report configuration (e.g., indicated by the first control signaling). If the UE 115-*b* received the second control signaling at 725 and updated the report configuration at 730, the UE 115-*b* may transmit the L1 report at 740 in accordance with the updated report configuration. For example, the UE 115-*b* may transmit the L1 report based on the one or more report parameters indicated in the second control signaling, or the L1 report may include channel information for the serving cells in accordance with the second control signaling.

In some cases, if the UE 115-*b* receives the second control signaling and updates the L1 report configuration, the UE 115-*b* may maintain the updated report configuration for transmitting a quantity of L1 reports, or for a time duration. In such cases, the UE 115-*b* may stop using the updated report configuration and may return to a previously used or default report configuration after transmitting the quantity of L1 reports, or after the time duration has passed. Alternatively, the UE 115-*b* may maintain the updated report configuration until the UE 115-*b* receives (e.g., from the network entity 105-*a*) additional control signaling. For example, the UE 115-*b* may receive (e.g., from the network entity 105-*a*) third control signaling that indicates one or more reporting parameters, serving cells, reporting formats, etc. and may update the L1 report confirmation based on the third control signaling.

Figure 8:
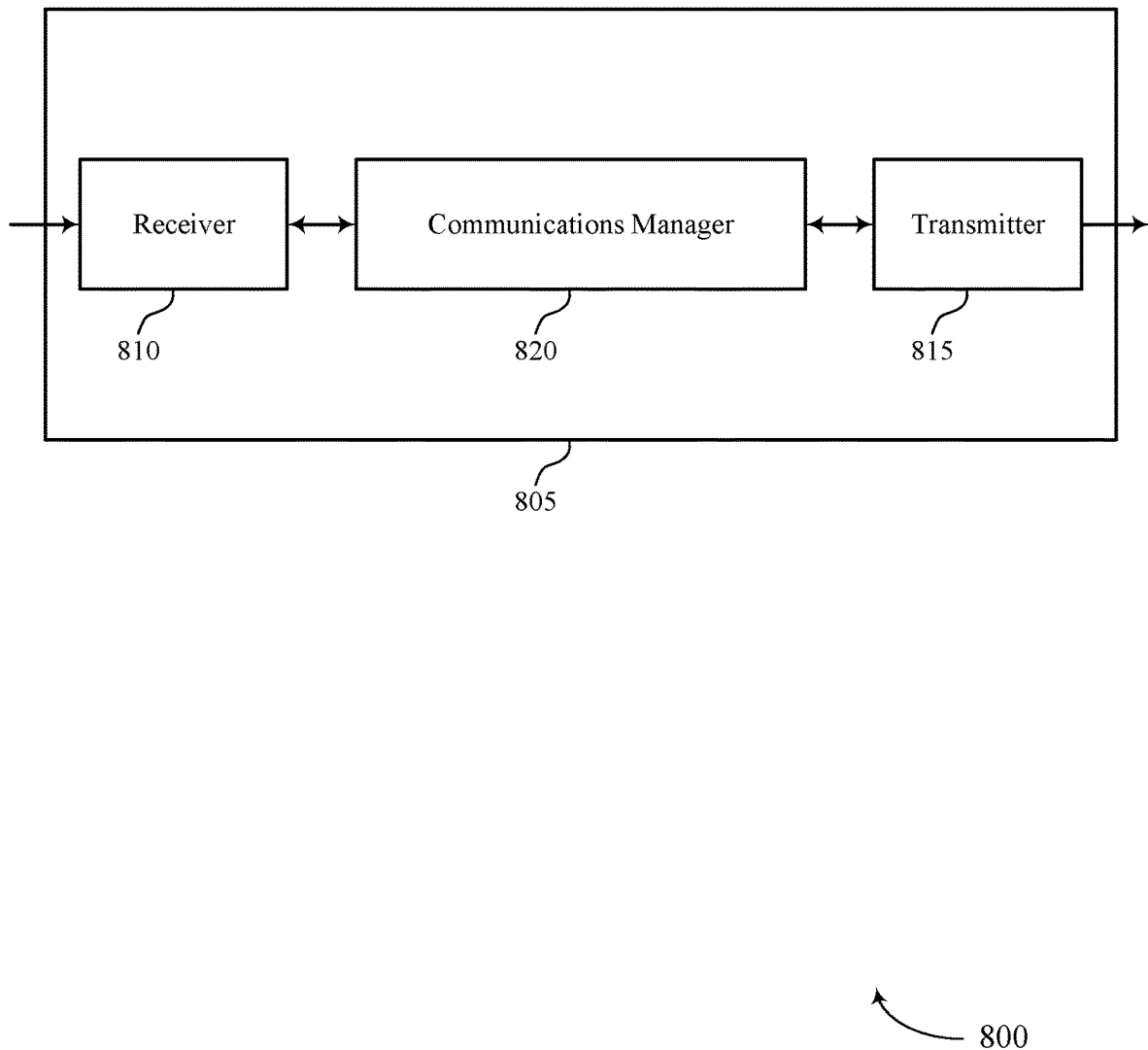
FIGS. 8 and 9 show block diagrams of devices that support dynamic reporting techniques for inter-cell mobility in accordance with one or more aspects of the present disclosure.

FIG. 8 shows a block diagram 800 of a device 805 that supports dynamic reporting techniques for inter-cell mobility in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic reporting techniques for inter-cell mobility). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic reporting techniques for inter-cell mobility). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of dynamic reporting techniques for inter-cell mobility as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for receiving first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The communications manager 820 may be configured as or otherwise support a means for performing one or more channel measurements for the one or more cell groups based on the L1 report configuration. The communications manager 820 may be configured as or otherwise support a means for transmitting an L1 report including channel information for the one or more cell groups based on the one or more channel measurements, the L1 report being transmitted in accordance with the L1 report configuration.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for L1 measurement and reporting for both inactive and active serving cells. The device 805 may obtain and report channel information for inactive serving cells, which may reduce latency and improve efficiency in inter-cell mobility procedures. For example, the device 805 may perform handover to a serving cell associated with relatively better channel quality based on the channel information, thereby reducing processing and power consumption associated with poor service and performance. Further, enabling dynamic report configuration updating via L1/L2 signaling may reduce signaling overhead and improve performance at the device 805.

Figure 9:
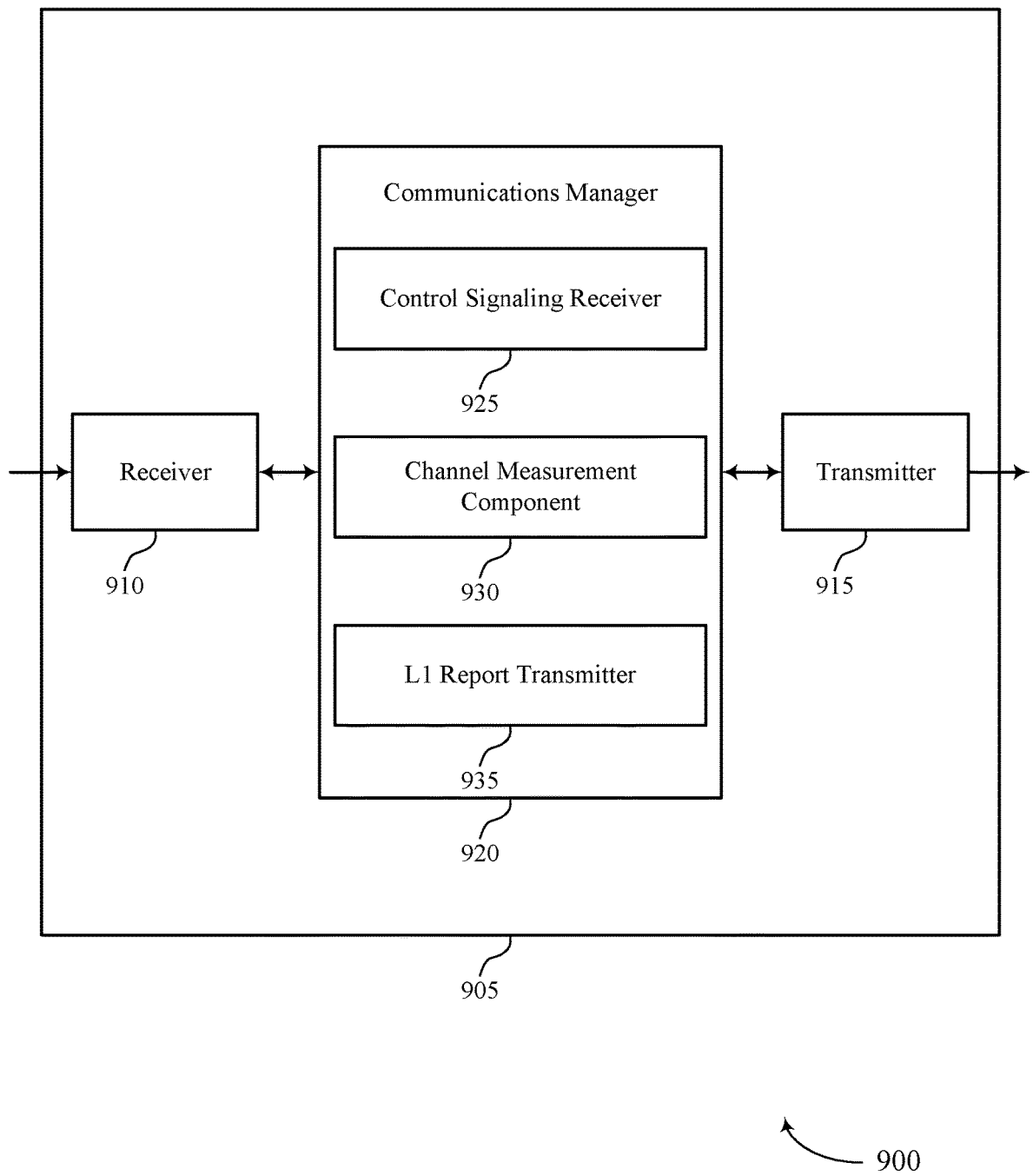

FIG. 9 shows a block diagram 900 of a device 905 that supports dynamic reporting techniques for inter-cell mobility in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic reporting techniques for inter-cell mobility). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic reporting techniques for inter-cell mobility). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of dynamic reporting techniques for inter-cell mobility as described herein. For example, the communications manager 920 may include a control signaling receiver 925, a channel measurement component 930, an L1 report transmitter 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The control signaling receiver 925 may be configured as or otherwise support a means for receiving first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The channel measurement component 930 may be configured as or otherwise support a means for performing one or more channel measurements for the one or more cell groups based on the L1 report configuration. The L1 report transmitter 935 may be configured as or otherwise support a means for transmitting an L1 report including channel information for the one or more cell groups based on the one or more channel measurements, the L1 report being transmitted in accordance with the L1 report configuration.

Figure 10:
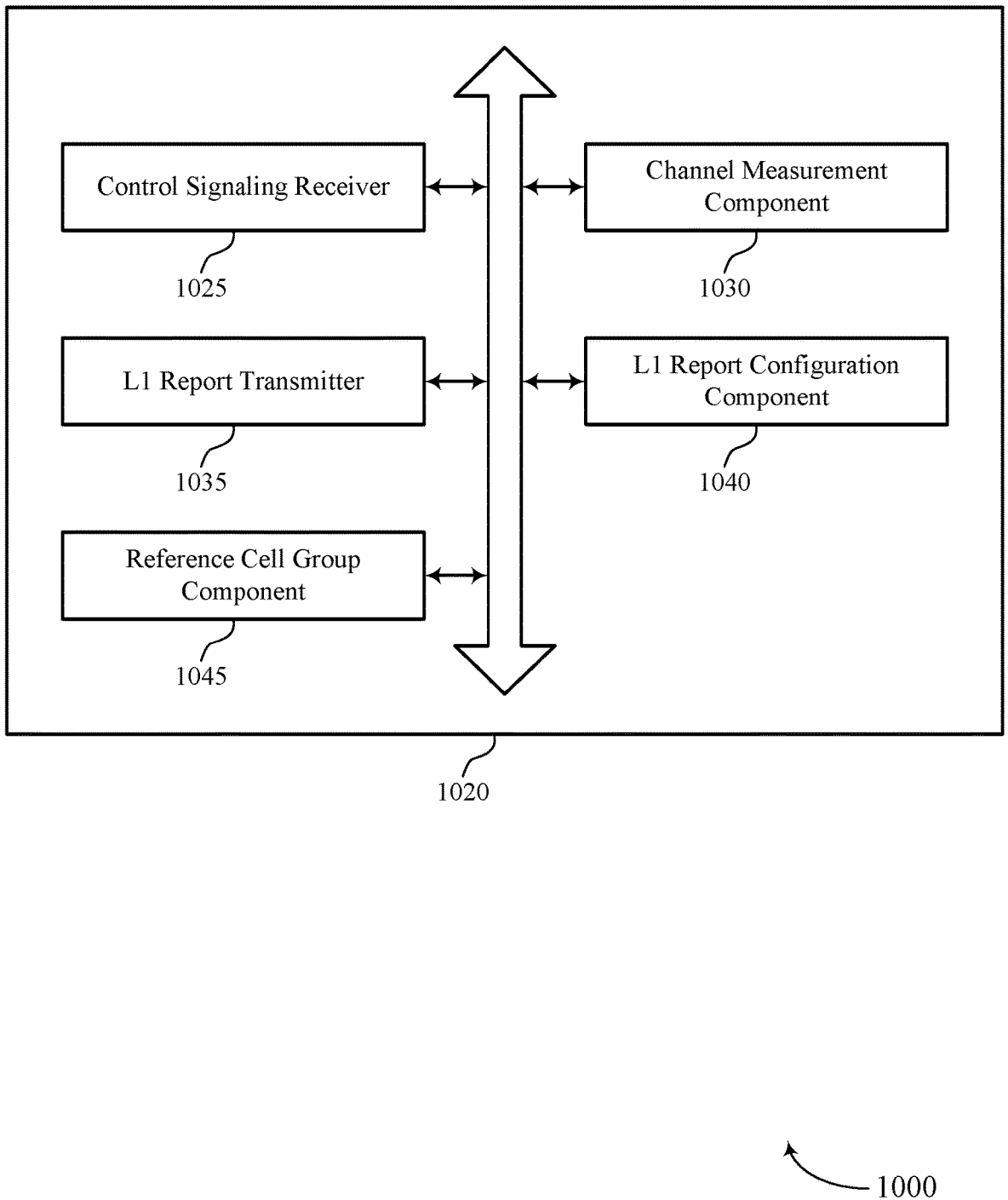
FIG. 10 shows a block diagram of a communications manager that supports dynamic reporting techniques for inter-cell mobility in accordance with one or more aspects of the present disclosure.

FIG. 10 shows a block diagram 1000 of a communications manager 1020 that supports dynamic reporting techniques for inter-cell mobility in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of dynamic reporting techniques for inter-cell mobility as described herein. For example, the communications manager 1020 may include a control signaling receiver 1025, a channel measurement component 1030, an L1 report transmitter 1035, an L1 report configuration component 1040, a reference cell group component 1045, or any combination thereof. Each of these components may communicate, directly or indirectly, with one another (e.g., via one or more buses).

The communications manager 1020 may support wireless communications at a UE in accordance with examples as disclosed herein. The control signaling receiver 1025 may be configured as or otherwise support a means for receiving first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The channel measurement component 1030 may be configured as or otherwise support a means for performing one or more channel measurements for the one or more cell groups based on the L1 report configuration. The L1 report transmitter 1035 may be configured as or otherwise support a means for transmitting an L1 report including channel information for the one or more cell groups based on the one or more channel measurements, the L1 report being transmitted in accordance with the L1 report configuration.

In some examples, the control signaling receiver 1025 may be configured as or otherwise support a means for receiving second control signaling indicating a second reporting format for the L1 report that is modified with respect to a first reporting format indicated by the first control signaling. In some examples, the L1 report configuration component 1040 may be configured as or otherwise support a means for updating the L1 report configuration based on the second reporting format, the L1 report being based on the updated L1 report configuration.

In some examples, the second control signaling indicates one or more serving cells from the one or more cell groups for channel measurement and reporting. In some examples, to support performing the one or more channel measurements, the channel measurement component 1030 may be configured as or otherwise support a means for performing the one or more channel measurements for the one or more serving cells based on the second control signaling, where the L1 report includes channel information for the one or more serving cells in accordance with the second control signaling.

In some examples, the second control signaling further includes an indication of one or more parameters for the L1 report configuration, and the L1 report configuration component 1040 may be configured as or otherwise support a means for updating the L1 report configuration based on the one or more parameters, where the channel information is reported via the L1 report in accordance with the updated L1 report configuration. In some examples, the one or more parameters include a report configuration or a report periodicity, or both, the channel information being reported via the L1 report based on the report configuration or the report periodicity, or both.

In some examples, the second control signaling includes a bitmap for respective cell indices associated with each serving cell of the one or more serving cells.

In some examples, the reference cell group component 1045 may be configured as or otherwise support a means for identifying, based on the L1 report configuration, a reference cell group from the one or more cell groups, the reference cell group including a threshold quantity of serving cells for channel measurement and reporting, where the second control signaling indicates one or more serving cells for the channel measurement and reporting that have changed with respect to serving cells of the reference cell group, and where performing the one or more channel measurements includes. In some examples, the channel measurement component 1030 may be configured as or otherwise support a means for performing the one or more channel measurements for the one or more serving cells based on the second control signaling, where the L1 report includes channel information for the one or more serving cells in accordance with the second control signaling.

In some examples, the control signaling receiver 1025 may be configured as or otherwise support a means for receiving, within the first control signaling, an indication of the reference cell group, where the reference cell group is identified based on the first control signaling. In some examples, the reference cell group includes a predefined set of serving cells. In some examples, the reference cell group includes a set of one or more serving cells included in a prior L1 report.

In some examples, the second control signaling indicates a subset of serving cells from the one or more cell groups for channel measurement and reporting, the subset of serving cells selected from a plurality of subsets of serving cells. In some examples, to support performing the one or more channel measurements, the channel measurement component 1030 may be configured as or otherwise support a means for performing the one or more channel measurements for the subset of serving cells based on the second control signaling, where the L1 report includes channel information for the subset of serving cells in accordance with the second control signaling. In some examples, respective subsets of serving cells of the set of multiple subsets of serving cells are based on a cell location, a cell status, or any combination thereof.

In some examples, the L1 report configuration component 1040 may be configured as or otherwise support a means for maintaining the updated L1 report configuration for transmitting one or more L1 reports until additional control signaling is received. In some examples, the L1 report configuration component 1040 may be configured as or otherwise support a means for maintaining the updated L1 report configuration for transmitting one or more L1 reports based on a time duration or a quantity of L1 reports, or both.

In some examples, to support updating the L1 report, the L1 report configuration component 1040 may be configured as or otherwise support a means for updating the L1 report configuration after a time duration, the time duration being based on receiving the second control signaling, an acknowledgment associated with the second control signaling, a configured timer associated with receiving the second control signaling, or any combination thereof.

In some examples, a first cell group of the one or more cell groups is associated with a first layer one report configuration for reporting measurements associated with the first cell group, and a second cell group of the one or more cell groups is associated with a second layer one report configuration for reporting measurements associated with the second cell group. In some examples, to support performing the one or more channel measurements, the channel measurement component 1030 may be configured as or otherwise support a means for performing a first set of channel measurements for the first cell group based on the first L1 report configuration. In some examples, to support performing the one or more channel measurements, the channel measurement component 1030 may be configured as or otherwise support a means for performing a second set of channel measurements for the second cell group based on the second L1 report configuration, where the L1 report includes channel information associated with the first cell group and the second cell group based on the first set of channel measurements and the second set of channel measurements, the L1 report being transmitted in accordance with the first L1 report configuration and the second L1 report configuration. In some examples, the first cell group of the one or more cell groups includes the active serving cells and the second cell group of the one or more cell groups includes the inactive serving cells.

In some examples, the one or more cell groups are based on at least one of an activation status and a candidate cell set for the inter-cell mobility procedures. In some examples, a first cell group of the one or more cell groups includes the active serving cells and a second cell group of the one or more cell groups includes the inactive serving cells.

In some examples, the first control signaling further indicates a set of L1 report configurations associated with the inactive serving cells.

In some examples, the L1 report configuration indicates the one or more channel measurements to be performed by the UE, one or more quantities associated with the one or more channel measurements to be included in the L1 report, one or more physical cell identifiers associated with the one or more cell groups, or a combination thereof. In some examples, the one or more quantities associated with the one or more channel measurements include a first channel measurement value associated with a first cell of the one or more cell groups and a first differential value with respect to the first channel measurement value and associated with a second cell of the one or more cell groups.

Figure 11:
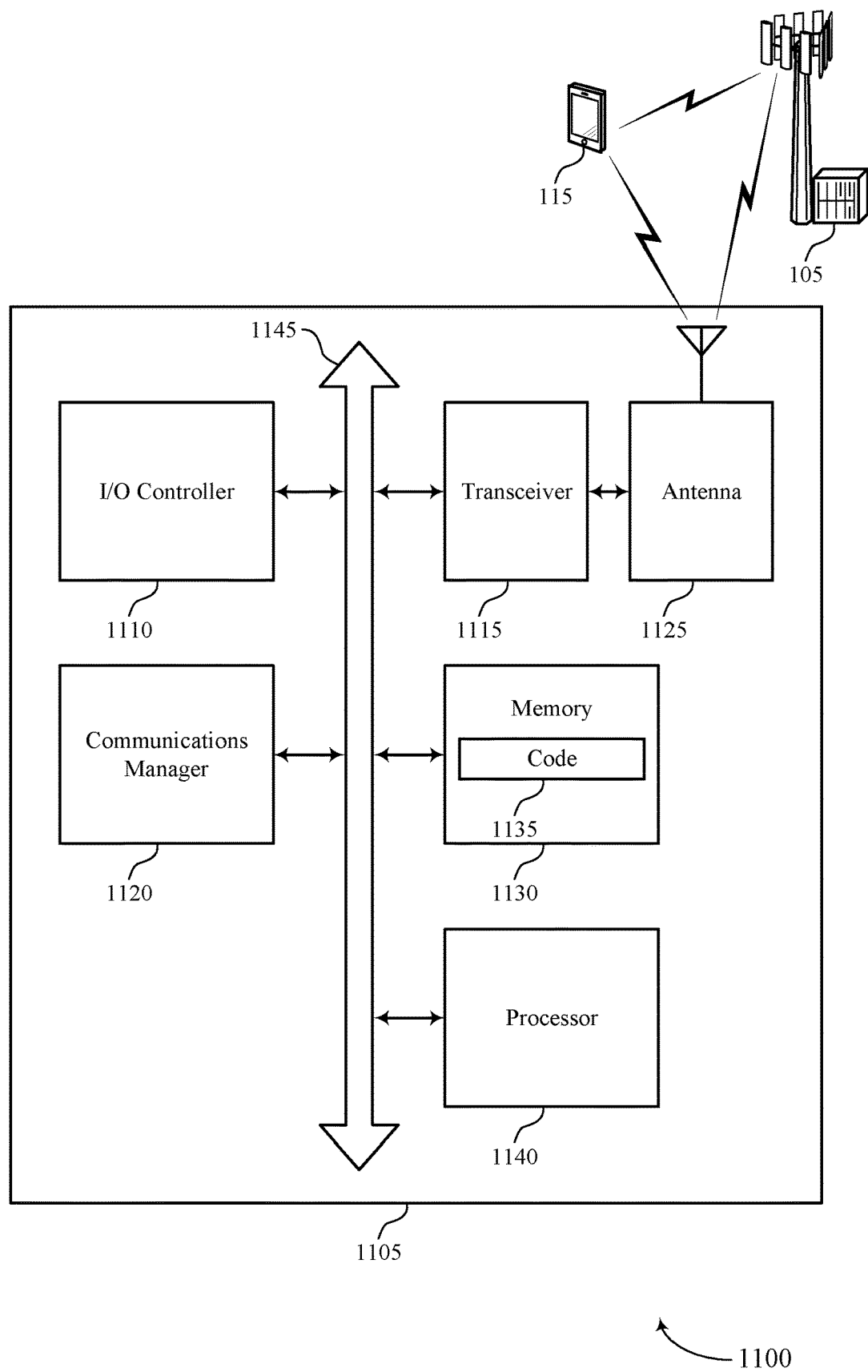
FIG. 11 shows a diagram of a system including a device that supports dynamic reporting techniques for inter-cell mobility in accordance with one or more aspects of the present disclosure.

FIG. 11 shows a diagram of a system 1100 including a device 1105 that supports dynamic reporting techniques for inter-cell mobility in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting dynamic reporting techniques for inter-cell mobility). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The communications manager 1120 may be configured as or otherwise support a means for performing one or more channel measurements for the one or more cell groups based on the L1 report configuration. The communications manager 1120 may be configured as or otherwise support a means for transmitting an L1 report including channel information for the one or more cell groups based on the one or more channel measurements, the L1 report being transmitted in accordance with the L1 report configuration.

By including or configuring the communications manager 1120 in accordance with examples as described herein, the device 1105 may support techniques for L1 measurement and reporting for both inactive and active serving cells. The device 1105 may obtain and report channel information for inactive serving cells, which may reduce latency and improve efficiency in inter-cell mobility procedures. Further, enabling dynamic report configuration updating via L1/L2 signaling may reduce signaling overhead and improve communications efficiency between the device 1105 and one or more serving cells.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of dynamic reporting techniques for inter-cell mobility as described herein, or the processor 1140 and the memory 1130 may be otherwise configured to perform or support such operations.

Figure 12:
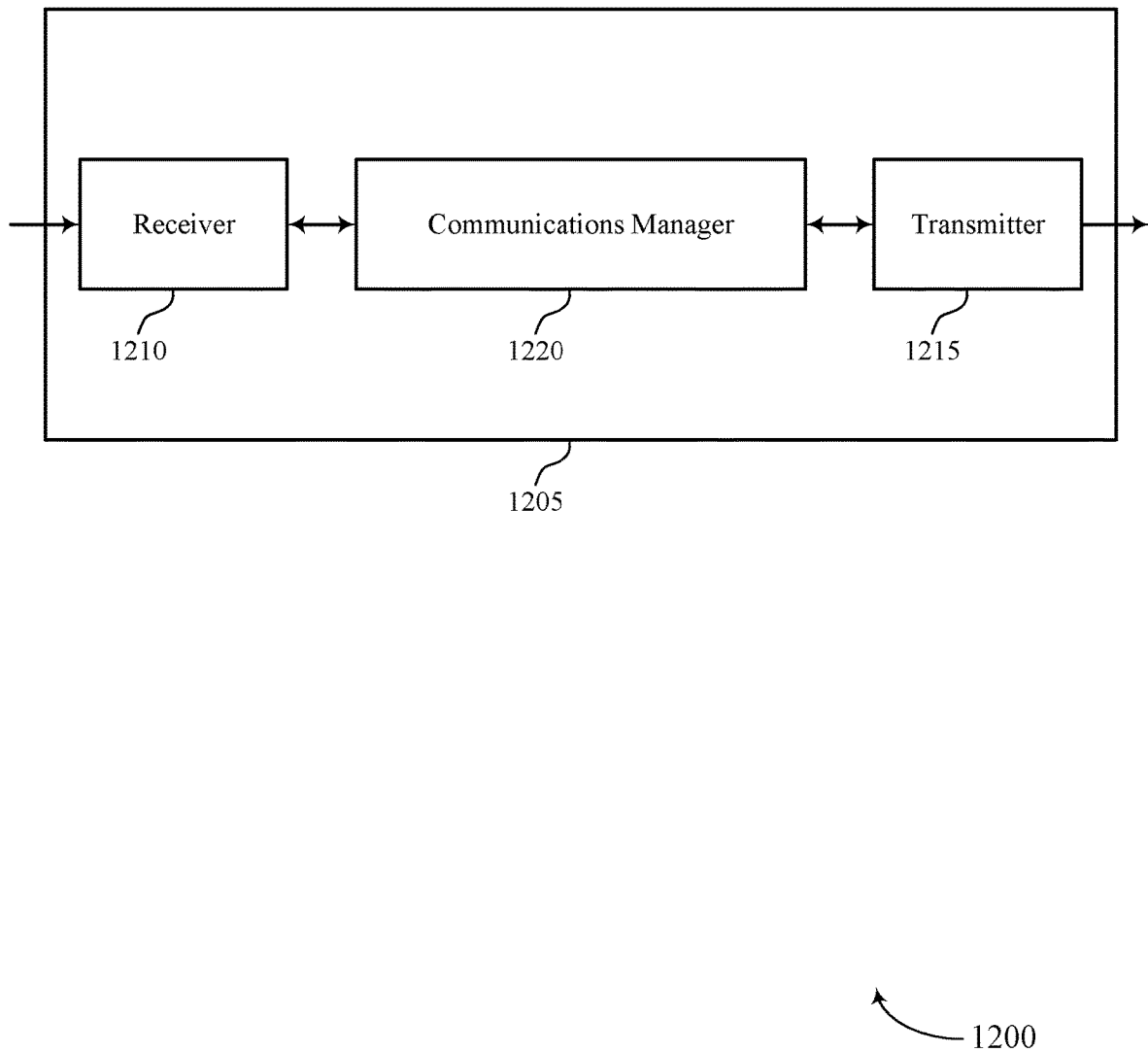
FIGS. 12 and 13 show block diagrams of devices that support dynamic reporting techniques for inter-cell mobility in accordance with one or more aspects of the present disclosure.

FIG. 12 shows a block diagram 1200 of a device 1205 that supports dynamic reporting techniques for inter-cell mobility in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of dynamic reporting techniques for inter-cell mobility as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. For example, the communications manager 1220 may be configured as or otherwise support a means for transmitting first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The communications manager 1220 may be configured as or otherwise support a means for receiving an L1 report including channel information for the one or more cell groups based on one or more channel measurements, the L1 report being received in accordance with the L1 report configuration.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for L1 measurement and reporting for both inactive and active serving cells. The device 1205 may obtain and report channel information for inactive serving cells, which may reduce latency and improve efficiency in inter-cell mobility procedures. For example, the device 1205 may initiate handover of a UE to a serving cell associated with relatively better channel quality based on the channel information, thereby reducing processing and power consumption associated with poor service and performance. Further, enabling dynamic report configuration updating via L1/L2 signaling may reduce signaling overhead and improve performance at the device 1205.

Figure 13:
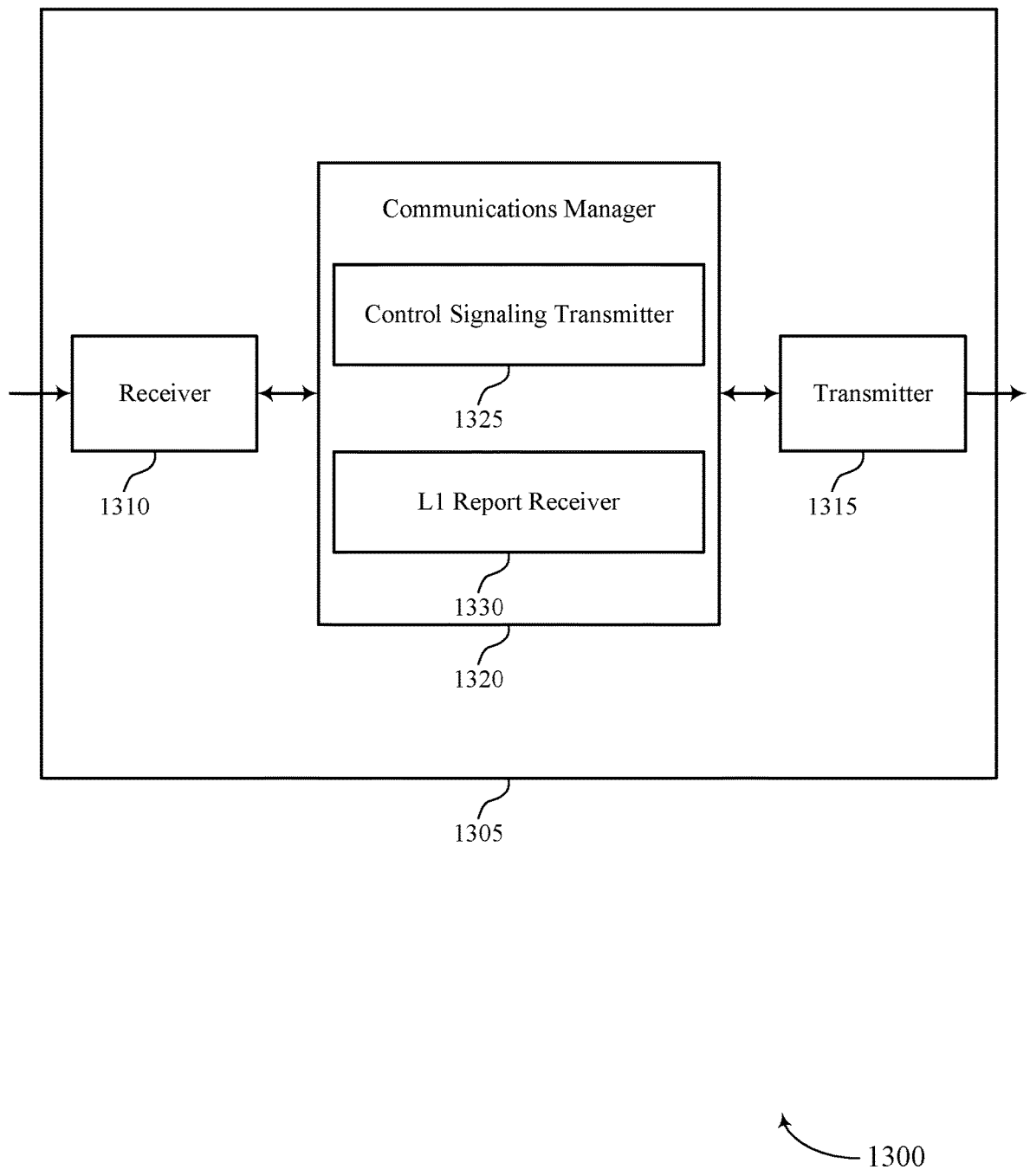

FIG. 13 shows a block diagram 1300 of a device 1305 that supports dynamic reporting techniques for inter-cell mobility in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of dynamic reporting techniques for inter-cell mobility as described herein. For example, the communications manager 1320 may include a control signaling transmitter 1325 an L1 report receiver 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. The control signaling transmitter 1325 may be configured as or otherwise support a means for transmitting first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The L1 report receiver 1330 may be configured as or otherwise support a means for receiving an L1 report including channel information for the one or more cell groups based on one or more channel measurements, the L1 report being received in accordance with the L1 report configuration.

Figure 14:
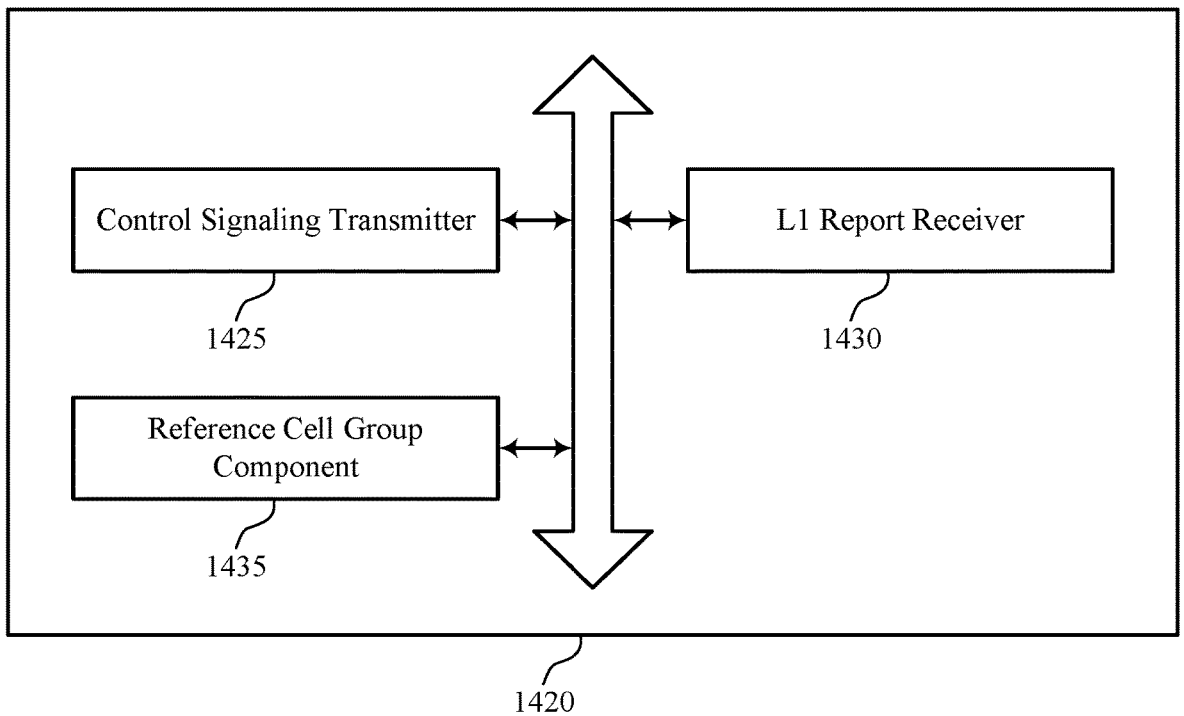
FIG. 14 shows a block diagram of a communications manager that supports dynamic reporting techniques for inter-cell mobility in accordance with one or more aspects of the present disclosure.

FIG. 14 shows a block diagram 1400 of a communications manager 1420 that supports dynamic reporting techniques for inter-cell mobility in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of dynamic reporting techniques for inter-cell mobility as described herein. For example, the communications manager 1420 may include a control signaling transmitter 1425, an L1 report receiver 1430, a reference cell group component 1435, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications at a network entity in accordance with examples as disclosed herein. The control signaling transmitter 1425 may be configured as or otherwise support a means for transmitting first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The L1 report receiver 1430 may be configured as or otherwise support a means for receiving an L1 report including channel information for the one or more cell groups based on one or more channel measurements, the L1 report being received in accordance with the L1 report configuration.

In some examples, the control signaling transmitter 1425 may be configured as or otherwise support a means for transmitting second control signaling indicating a second reporting format for the L1 report that is modified with respect to a first reporting format indicated by the first control signaling, where the received L1 report corresponds to an updated L1 report configuration based on the second reporting format.

In some examples, the second control signaling indicates one or more serving cells from the one or more cell groups for channel measurement and reporting. In some examples, the L1 report includes channel information for the one or more serving cells in accordance with the second control signaling.

In some examples, the second control signaling further includes an indication of one or more parameters for the L1 report configuration. In some examples, the L1 report configuration is updated based on the one or more parameters, the channel information being reported via the L1 report in accordance with the updated L1 report configuration. In some examples, the one or more parameters include a report configuration or a report periodicity, or both, the channel information being reported via the L1 report based on the report configuration or the report periodicity, or both.

In some examples, the second control signaling includes a bitmap for respective cell indices associated with each serving cell of the one or more serving cells.

In some examples, the reference cell group component 1435 may be configured as or otherwise support a means for selecting a reference cell group from the one or more cell groups, the reference cell group including a threshold quantity of serving cells for channel measurement and reporting, where the second control signaling indicates one or more serving cells for the channel measurement and reporting that have changed with respect to serving cells of the reference cell group, and where the L1 report includes channel information for the one or more serving cells in accordance with the second control signaling.

In some examples, the control signaling transmitter 1425 may be configured as or otherwise support a means for transmitting, within the first control signaling, an indication of the reference cell group, where the reference cell group is identified based on the first control signaling. In some examples, the reference cell group includes a predefined set of serving cells. In some examples, the reference cell group includes a set of one or more serving cells included in a prior L1 report.

In some examples, the second control signaling indicates a subset of serving cells from the one or more cell groups for channel measurement and reporting, the subset of serving cells selected from a set of multiple subsets of serving cells. In some examples, the L1 report includes channel information for the subset of serving cells in accordance with the second control signaling. In some examples, respective subsets of serving cells of the set of multiple subsets of serving cells are based on a cell location, a cell status, or any combination thereof.

In some examples, a first cell group of the one or more cell groups is associated with a first L1 report configuration for reporting measurements associated with the first cell group, and a second cell group of the one or more cell groups is associated with a second L1 report configuration for reporting measurements associated with the second cell group. In some examples, the L1 report includes channel information associated with the first cell group and the second cell group based on the first set of channel measurements and the second set of channel measurements, the L1 report being transmitted in accordance with the first L1 report configuration and the second L1 report configuration. In some examples, the first cell group of the one or more cell groups includes the active serving cells and the second cell group of the one or more cell groups includes the inactive serving cells.

In some examples, the one or more cell groups are based on at least one of an activation status and a candidate cell set for the inter-cell mobility procedures. In some examples, a first cell group of the one or more cell groups includes the active serving cells and a second cell group of the one or more cell groups includes the inactive serving cells.

In some examples, the first control signaling further indicates a set of L1 report configurations associated with the inactive serving cells.

In some examples, the L1 report configuration indicates the one or more channel measurements to be performed by the UE, one or more quantities associated with the one or more channel measurements to be included in the L1 report, one or more physical cell identifiers associated with the one or more cell groups, or a combination thereof. In some examples, the one or more quantities associated with the one or more channel measurements include a first channel measurement value associated with a first cell of the one or more cell groups and a first differential value with respect to the first channel measurement value and associated with a second cell of the one or more cell groups.

Figure 15:
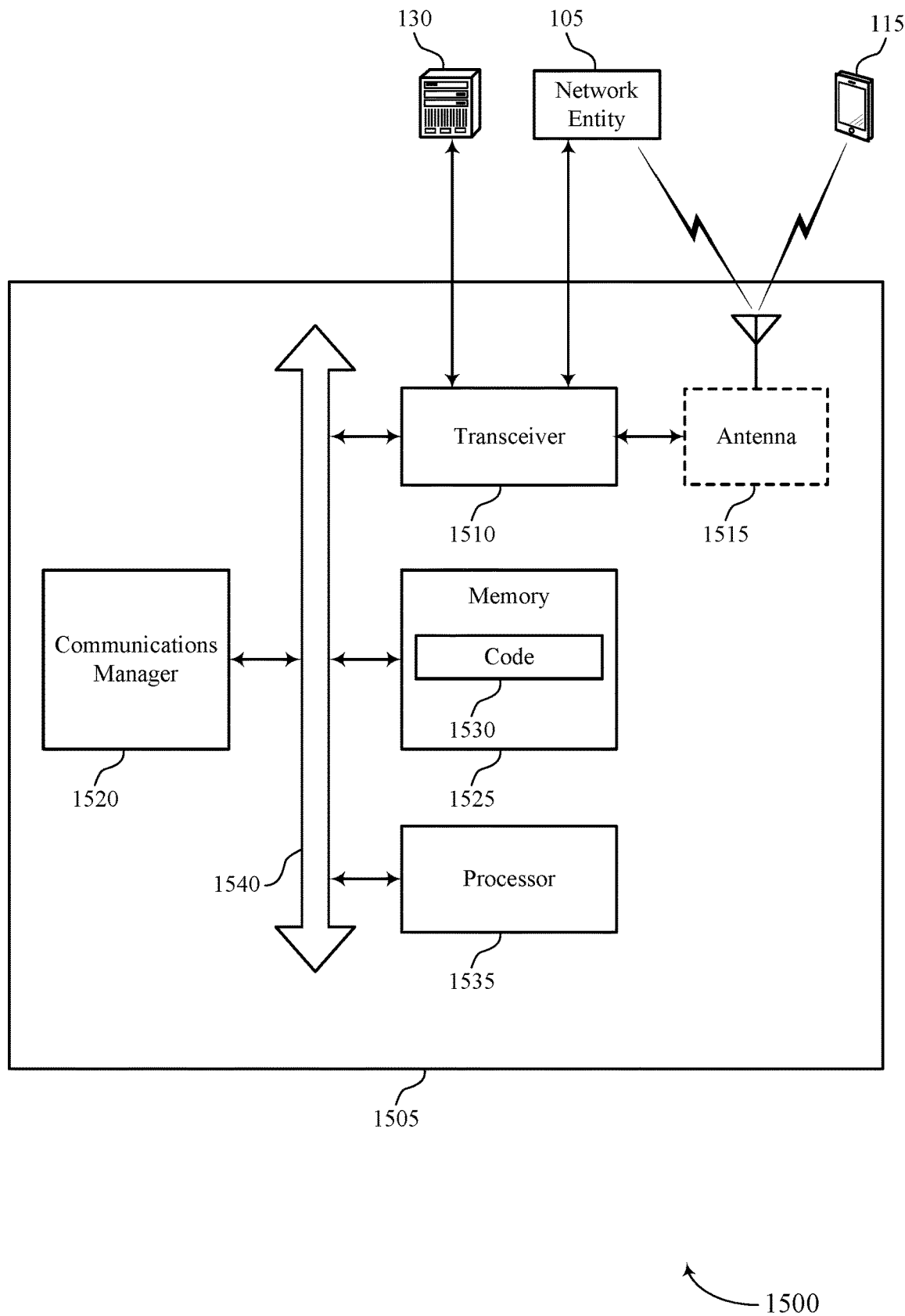
FIG. 15 shows a diagram of a system including a device that supports dynamic reporting techniques for inter-cell mobility in accordance with one or more aspects of the present disclosure.

FIG. 15 shows a diagram of a system 1500 including a device 1505 that supports dynamic reporting techniques for inter-cell mobility in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting dynamic reporting techniques for inter-cell mobility). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a network entity in accordance with examples as disclosed herein. For example, the communications manager 1520 may be configured as or otherwise support a means for transmitting first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The communications manager 1520 may be configured as or otherwise support a means for receiving an L1 report including channel information for the one or more cell groups based on one or more channel measurements, the L1 report being received in accordance with the L1 report configuration.

By including or configuring the communications manager 1520 in accordance with examples as described herein, the device 1505 may support techniques for L1 measurement and reporting for both inactive and active serving cells. The device 1505 may obtain channel information for inactive serving cells, which may reduce latency and improve efficiency in inter-cell mobility procedures. Further, enabling dynamic report configuration updating via L1/L2 signaling may reduce signaling overhead and improve communications efficiency between the device 1505 and one or more UEs associated with the serving cells.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of dynamic reporting techniques for inter-cell mobility as described herein, or the processor 1535 and the memory 1525 may be otherwise configured to perform or support such operations.

Figure 16:
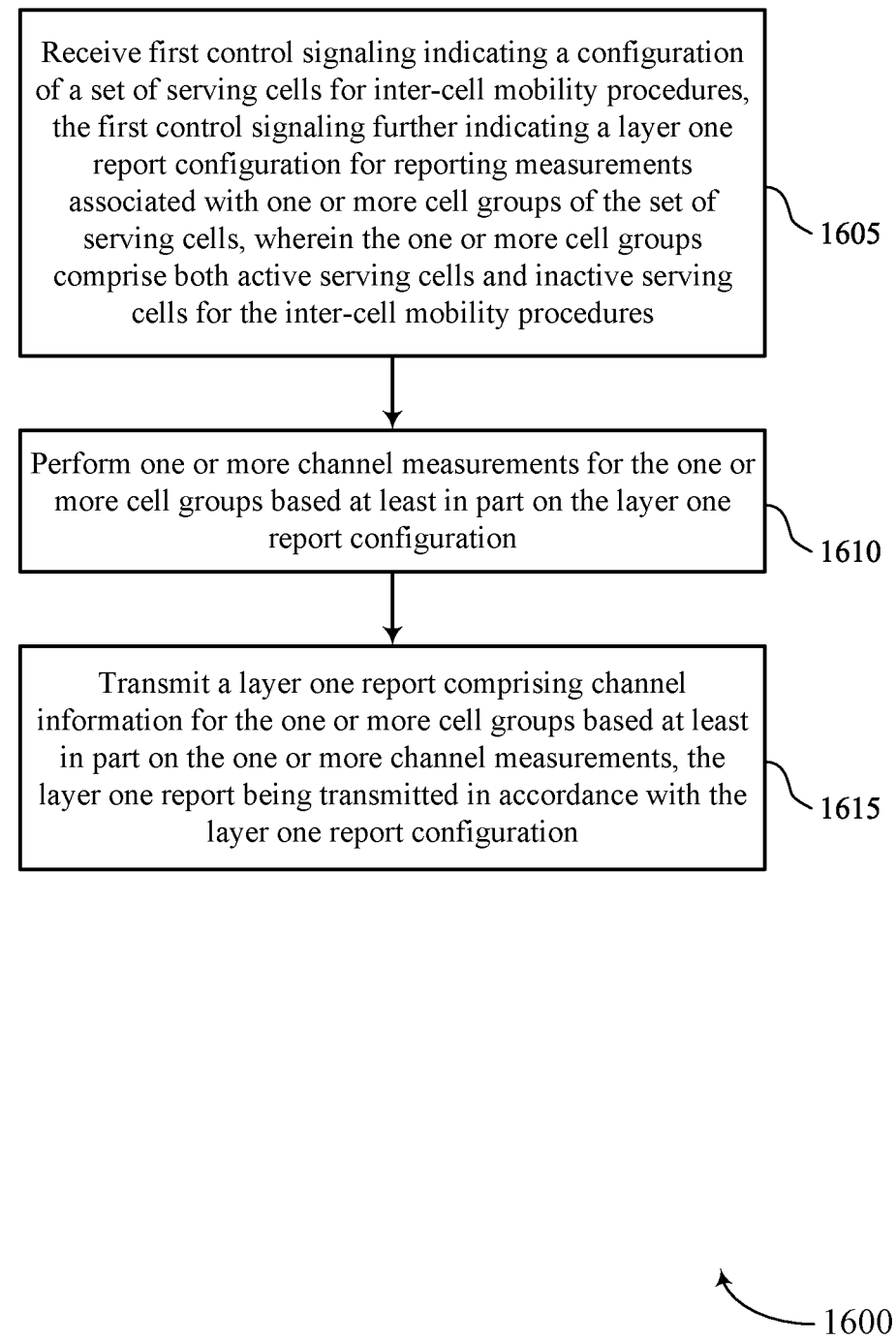
FIGS. 16 through 19 show flowcharts illustrating methods that support dynamic reporting techniques for inter-cell mobility in accordance with one or more aspects of the present disclosure.

FIG. 16 shows a flowchart illustrating a method 1600 that supports dynamic reporting techniques for inter-cell mobility in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The operations of 1605 may be performed in accordance with examples as disclosed herein. In some examples, aspects of the operations of 1605 may be performed by a control signaling receiver 1025 as described with reference to FIG. 10.

At 1610, the method may include performing one or more channel measurements for the one or more cell groups based on the L1 report configuration. The operations of 1610 may be performed in accordance with examples as disclosed herein. In some examples, aspects of the operations of 1610 may be performed by a channel measurement component 1030 as described with reference to FIG. 10.

At 1615, the method may include transmitting an L1 report including channel information for the one or more cell groups based on the one or more channel measurements, the L1 report being transmitted in accordance with the L1 report configuration. The operations of 1615 may be performed in accordance with examples as disclosed herein. In some examples, aspects of the operations of 1615 may be performed by an L1 report transmitter 1035 as described with reference to FIG. 10.

Figure 17:
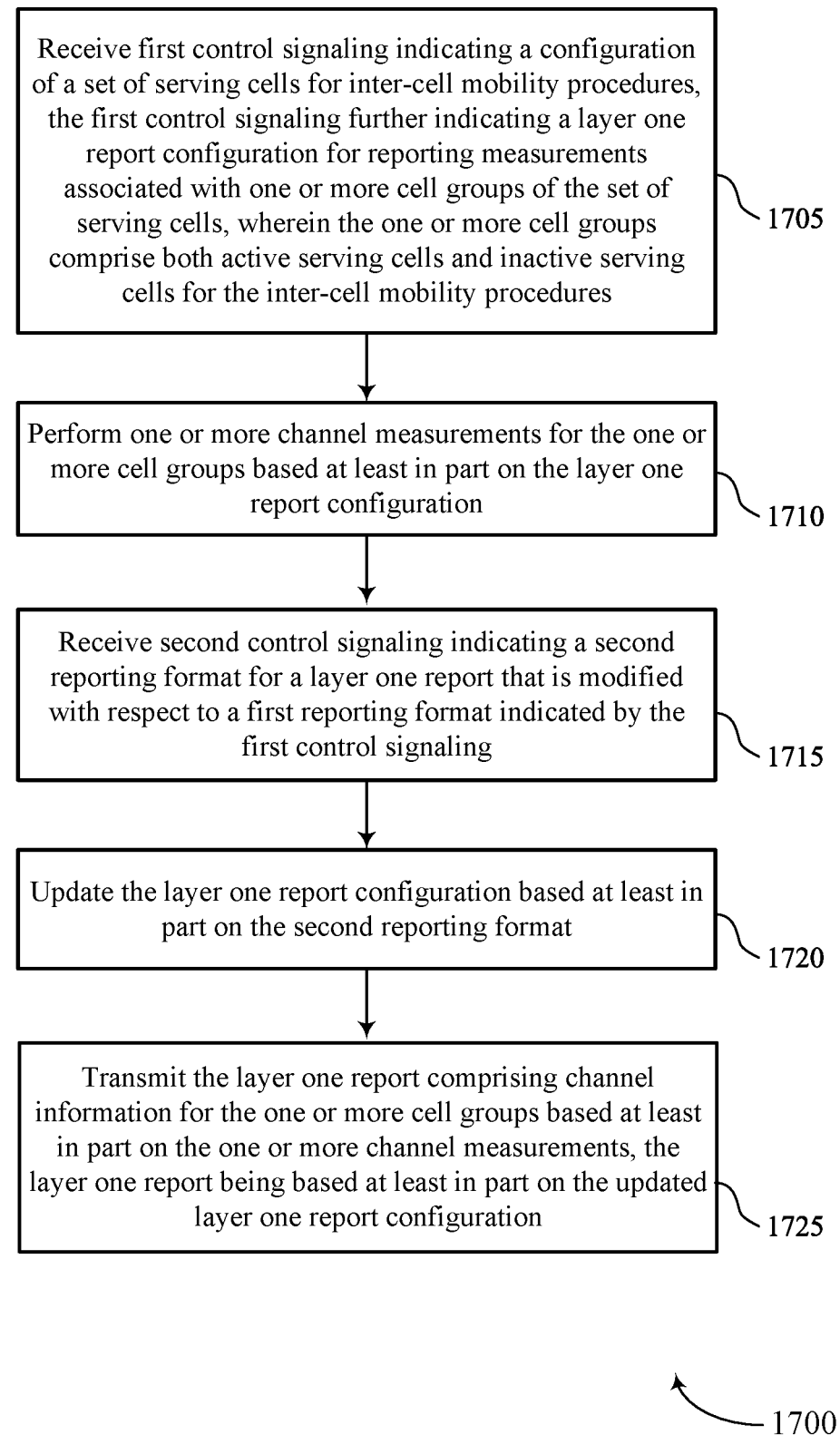

FIG. 17 shows a flowchart illustrating a method 1700 that supports dynamic reporting techniques for inter-cell mobility in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The operations of 1705 may be performed in accordance with examples as disclosed herein. In some examples, aspects of the operations of 1705 may be performed by a control signaling receiver 1025 as described with reference to FIG. 10.

At 1710, the method may include performing one or more channel measurements for the one or more cell groups based on the L1 report configuration. The operations of 1710 may be performed in accordance with examples as disclosed herein. In some examples, aspects of the operations of 1710 may be performed by a channel measurement component 1030 as described with reference to FIG. 10.

At 1715, the method may include receiving second control signaling indicating a second reporting format for an L1 report that is modified with respect to a first reporting format indicated by the first control signaling. The operations of 1715 may be performed in accordance with examples as disclosed herein. In some examples, aspects of the operations of 1715 may be performed by a control signaling receiver 1025 as described with reference to FIG. 10.

At 1720, the method may include updating the L1 report configuration based on the second reporting format. The operations of 1720 may be performed in accordance with examples as disclosed herein. In some examples, aspects of the operations of 1720 may be performed by an L1 report configuration component 1040 as described with reference to FIG. 10.

At 1725, the method may include transmitting an L1 report including channel information for the one or more cell groups based on the one or more channel measurements, the L1 report being based on the updated L1 report configuration. The operations of 1725 may be performed in accordance with examples as disclosed herein. In some examples, aspects of the operations of 1725 may be performed by an L1 report transmitter 1035 as described with reference to FIG. 10.

Figure 18:
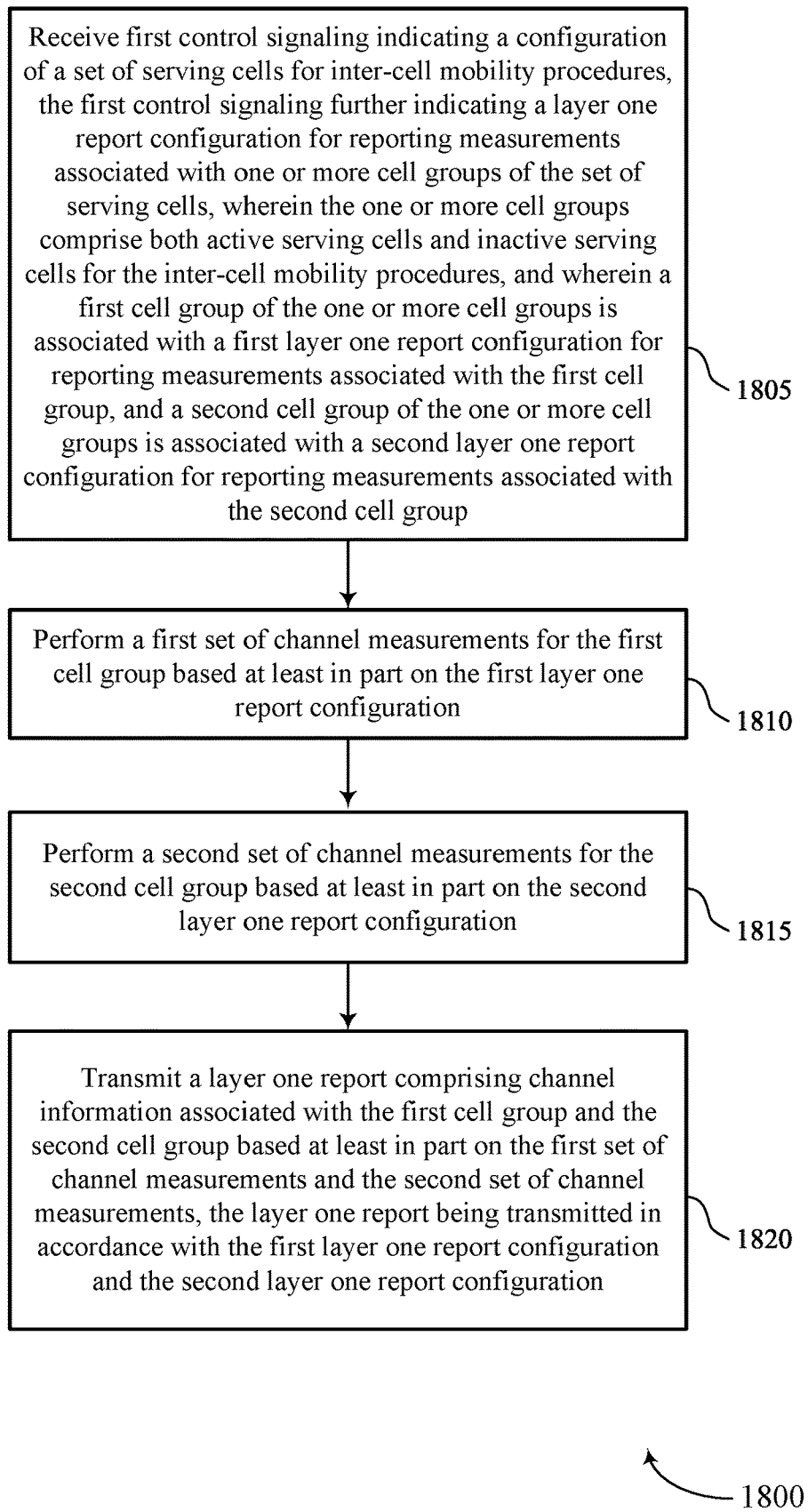

FIG. 18 shows a flowchart illustrating a method 1800 that supports dynamic reporting techniques for inter-cell mobility in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures, and where a first cell group of the one or more cell groups is associated with a first L1 report configuration for reporting measurements associated with the first cell group, and a second cell group of the one or more cell groups is associated with a second L1 report configuration for reporting measurements associated with the second cell group. The operations of 1805 may be performed in accordance with examples as disclosed herein. In some examples, aspects of the operations of 1805 may be performed by a control signaling receiver 1025 as described with reference to FIG. 10.

At 1810, the method may include performing a first set of channel measurements for the first cell group based on the first L1 report configuration. The operations of 1810 may be performed in accordance with examples as disclosed herein. In some examples, aspects of the operations of 1810 may be performed by a channel measurement component 1030 as described with reference to FIG. 10.

At 1815, the method may include performing a second set of channel measurements for the second cell group based on the second L1 report configuration. The operations of 1815 may be performed in accordance with examples as disclosed herein. In some examples, aspects of the operations of 1815 may be performed by a channel measurement component 1030 as described with reference to FIG. 10.

At 1820, the method may include transmitting an L1 report including channel information associated with the first cell group and the second cell group based on the first set of channel measurements and the second set of channel measurements, the L1 report being transmitted in accordance with the first L1 report configuration and the second L1 report configuration. The operations of 1820 may be performed in accordance with examples as disclosed herein. In some examples, aspects of the operations of 1820 may be performed by an L1 report transmitter 1035 as described with reference to FIG. 10.

Figure 19:
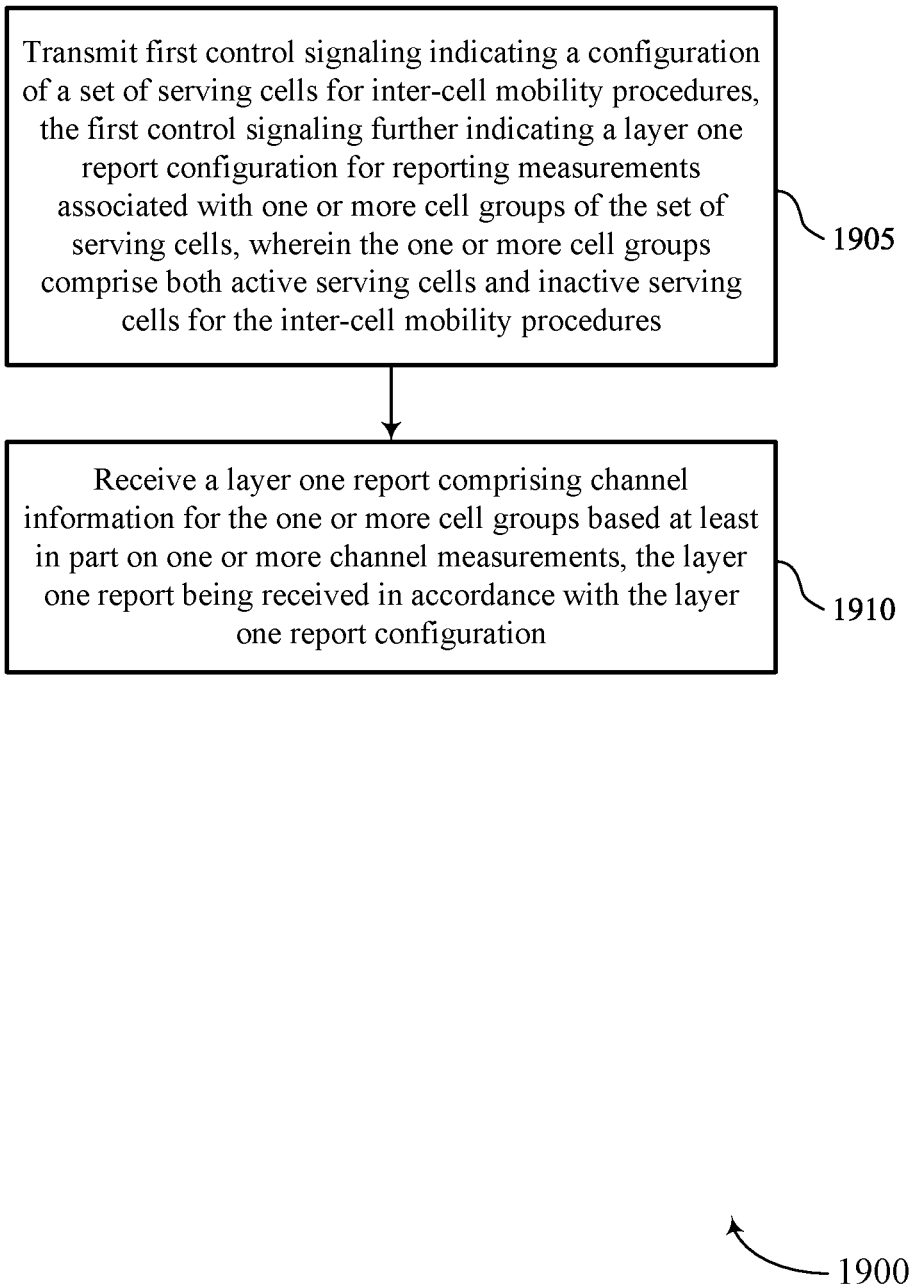

FIG. 19 shows a flowchart illustrating a method 1900 that supports dynamic reporting techniques for inter-cell mobility in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting first control signaling indicating a configuration of a set of serving cells for inter-cell mobility procedures, the first control signaling further indicating an L1 report configuration for reporting measurements associated with one or more cell groups of the set of serving cells, where the one or more cell groups include both active serving cells and inactive serving cells for the inter-cell mobility procedures. The operations of 1905 may be performed in accordance with examples as disclosed herein. In some examples, aspects of the operations of 1905 may be performed by a control signaling transmitter 1425 as described with reference to FIG. 14.

At 1910, the method may include receiving an L1 report including channel information for the one or more cell groups based on one or more channel measurements, the L1 report being received in accordance with the L1 report configuration. The operations of 1910 may be performed in accordance with examples as disclosed herein. In some examples, aspects of the operations of 1910 may be performed by an L1 report receiver 1430 as described with reference to FIG. 14.

The following provides an overview of aspects of the present disclosure:

Aspect 1: A method for wireless communications at a UE, comprising: receiving first control signaling indicating a configuration of a set of serving cells for inter-cell mobility procedures, the first control signaling further indicating an L1 report configuration for reporting measurements associated with one or more cell groups of the set of serving cells, wherein the one or more cell groups comprise both active serving cells and inactive serving cells for the inter-cell mobility procedures; performing one or more channel measurements for the one or more cell groups based at least in part on the L1 report configuration; and transmitting an L1 report comprising channel information for the one or more cell groups based at least in part on the one or more channel measurements, the L1 report being transmitted in accordance with the L1 report configuration.

Aspect 2: The method of aspect 1, further comprising: receiving second control signaling indicating a second reporting format for the L1 report that is modified with respect to a first reporting format indicated by the first control signaling; and updating the L1 report configuration based at least in part on the second reporting format, the L1 report being based at least in part on the updated L1 report configuration.

Aspect 3: The method of aspect 2, wherein the second control signaling indicates one or more serving cells from the one or more cell groups for channel measurement and reporting, wherein performing the one or more channel measurements comprises: performing the one or more channel measurements for the one or more serving cells based at least in part on the second control signaling, wherein the L1 report comprises channel information for the one or more serving cells in accordance with the second control signaling.

Aspect 4: The method of aspect 3, wherein the second control signaling further comprises an indication of one or more parameters for the L1 report configuration, the method further comprising: updating the L1 report configuration based at least in part on the one or more parameters, wherein the channel information is reported via the L1 report in accordance with the updated L1 report configuration.

Aspect 5: The method of aspect 4, wherein the one or more parameters comprise a report configuration or a report periodicity, or both, the channel information being reported via the L1 report based at least in part on the report configuration or the report periodicity, or both.

Aspect 6: The method of any of aspects 3 through 5, wherein the second control signaling comprises a bitmap for respective cell indices associated with each serving cell of the one or more serving cells.

Aspect 7: The method of aspect 1, further comprising: identifying, based at least in part on the L1 report configuration, a reference cell group from the one or more cell groups, the reference cell group comprising a threshold quantity of serving cells for channel measurement and reporting, wherein the second control signaling indicates one or more serving cells for the channel measurement and reporting that have changed with respect to serving cells of the reference cell group, and wherein performing the one or more channel measurements comprises: performing the one or more channel measurements for the one or more serving cells based at least in part on the second control signaling, wherein the L1 report comprises channel information for the one or more serving cells in accordance with the second control signaling.

Aspect 8: The method of aspect 7, further comprising: receiving, within the first control signaling, an indication of the reference cell group, wherein the reference cell group is identified based at least in part on the first control signaling.

Aspect 9: The method of aspect 7, wherein the reference cell group comprises a predefined set of serving cells.

Aspect 10: The method of any of aspects 7 through 8, wherein the reference cell group comprises a set of one or more serving cells included in a prior L1 report.

Aspect 11: The method aspect 1, wherein the second control signaling indicates a subset of serving cells from the one or more cell groups for channel measurement and reporting, the subset of serving cells selected from a plurality of subsets of serving cells, wherein performing the one or more channel measurements comprises: performing the one or more channel measurements for the subset of serving cells based at least in part on the second control signaling, wherein the L1 report comprises channel information for the subset of serving cells in accordance with the second control signaling.

Aspect 12: The method of aspect 11, wherein respective subsets of serving cells of the plurality of subsets of serving cells are based at least in part on a cell location, a cell status, or any combination thereof.

Aspect 13: The method of any of aspects 2 through 12, further comprising: maintaining the updated L1 report configuration for transmitting one or more L1 reports until additional control signaling is received.

Aspect 14: The method of any of aspects 2 through 12, further comprising: maintaining the updated L1 report configuration for transmitting one or more L1 reports based at least in part on a time duration or a quantity of L1 reports, or both.

Aspect 15: The method of any of aspects 2 through 14, wherein updating the L1 report further comprises: updating the L1 report configuration after a time duration, the time duration being based at least in part on receiving the second control signaling, an acknowledgment associated with the second control signaling, a configured timer associated with receiving the second control signaling, or any combination thereof.

Aspect 16: The method of any of aspects 1 through 15, wherein a first cell group of the one or more cell groups is associated with a first L1 report configuration for reporting measurements associated with the first cell group, and a second cell group of the one or more cell groups is associated with a second L1 report configuration for reporting measurements associated with the second cell group, wherein performing the one or more channel measurements comprises: performing a first set of channel measurements for the first cell group based at least in part on the first L1 report configuration; and performing a second set of channel measurements for the second cell group based at least in part on the second L1 report configuration, wherein the L1 report comprises channel information associated with the first cell group and the second cell group based at least in part on the first set of channel measurements and the second set of channel measurements, the L1 report being transmitted in accordance with the first L1 report configuration and the second L1 report configuration.

Aspect 17: The method of aspect 16, wherein the first cell group of the one or more cell groups comprises the active serving cells and the second cell group of the one or more cell groups comprises the inactive serving cells.

Aspect 18: The method of any of aspects 1 through 17, wherein the one or more cell groups are based at least in part on at least one of an activation status and a candidate cell set for the inter-cell mobility procedures.

Aspect 19: The method of aspect 18, wherein a first cell group of the one or more cell groups comprises the active serving cells and a second cell group of the one or more cell groups comprises the inactive serving cells.

Aspect 20: The method of any of aspects 1 through 19, wherein the first control signaling further indicates a set of L1 report configurations associated with the inactive serving cells.

Aspect 21: The method of any of aspects 1 through 20, wherein the L1 report configuration indicates the one or more channel measurements to be performed by the UE, one or more quantities associated with the one or more channel measurements to be included in the L1 report, one or more physical cell identifiers associated with the one or more cell groups, or a combination thereof.

Aspect 22: The method of aspect 21, wherein the one or more quantities associated with the one or more channel measurements comprise a first channel measurement value associated with a first cell of the one or more cell groups and a first differential value with respect to the first channel measurement value and associated with a second cell of the one or more cell groups.

Aspect 23: A method for wireless communications at a network entity, comprising: transmitting first control signaling indicating a configuration of a set of serving cells for inter-cell mobility procedures, the first control signaling further indicating an L1 report configuration for reporting measurements associated with one or more cell groups of the set of serving cells, wherein the one or more cell groups comprise both active serving cells and inactive serving cells for the inter-cell mobility procedures; and receiving an L1 report comprising channel information for the one or more cell groups based at least in part on one or more channel measurements, the L1 report being received in accordance with the L1 report configuration.

Aspect 24: The method of aspect 23, further comprising: transmitting second control signaling indicating a second reporting format for the L1 report that is modified with respect to a first reporting format indicated by the first control signaling, wherein the received L1 report corresponds to an updated L1 report configuration based at least in part on the second reporting format.

Aspect 25: The method of aspect 24, wherein the second control signaling indicates one or more serving cells from the one or more cell groups for channel measurement and reporting, the L1 report comprises channel information for the one or more serving cells in accordance with the second control signaling.

Aspect 26: The method of aspect 25, wherein the second control signaling further comprises an indication of one or more parameters for the L1 report configuration, and the L1 report configuration is updated based at least in part on the one or more parameters, the channel information being reported via the L1 report in accordance with the updated L1 report configuration.

Aspect 27: The method of aspect 26, wherein the one or more parameters comprise a report configuration or a report periodicity, or both, the channel information being reported via the L1 report based at least in part on the report configuration or the report periodicity, or both.

Aspect 28: The method of any of aspects 25 through 27, wherein the second control signaling comprises a bitmap for respective cell indices associated with each serving cell of the one or more serving cells.

Aspect 29: The method of aspect 23, further comprising: selecting a reference cell group from the one or more cell groups, the reference cell group comprising a threshold quantity of serving cells for channel measurement and reporting, wherein the second control signaling indicates one or more serving cells for the channel measurement and reporting that have changed with respect to serving cells of the reference cell group, and wherein the L1 report comprises channel information for the one or more serving cells in accordance with the second control signaling.

Aspect 30: The method of aspect 29, further comprising: transmitting, within the first control signaling, an indication of the reference cell group, wherein the reference cell group is identified based at least in part on the first control signaling.

Aspect 31: The method of aspect 29, wherein the reference cell group comprises a predefined set of serving cells.

Aspect 32: The method of any of aspects 29 through 31, wherein the reference cell group comprises a set of one or more serving cells included in a prior L1 report.

Aspect 33: The method of aspect 23, wherein the second control signaling indicates a subset of serving cells from the one or more cell groups for channel measurement and reporting, the subset of serving cells selected from a plurality of subsets of serving cells, the L1 report comprises channel information for the subset of serving cells in accordance with the second control signaling.

Aspect 34: The method of aspect 33, wherein respective subsets of serving cells of the plurality of subsets of serving cells are based at least in part on a cell location, a cell status, or any combination thereof.

Aspect 35: The method of any of aspects 23 through 34, wherein a first cell group of the one or more cell groups is associated with a first L1 report configuration for reporting measurements associated with the first cell group, and a second cell group of the one or more cell groups is associated with a second L1 report configuration for reporting measurements associated with the second cell group, and the L1 report comprises channel information associated with the first cell group and the second cell group based at least in part on the first set of channel measurements and the second set of channel measurements, the L1 report being transmitted in accordance with the first L1 report configuration and the second L1 report configuration.

Aspect 36: The method of aspect 35, wherein the first cell group of the one or more cell groups comprises the active serving cells and the second cell group of the one or more cell groups comprises the inactive serving cells.

Aspect 37: The method of any of aspects 23 through 36, wherein the one or more cell groups are based at least in part on at least one of an activation status and a candidate cell set for the inter-cell mobility procedures.

Aspect 38: The method of aspect 37, wherein a first cell group of the one or more cell groups comprises the active serving cells and a second cell group of the one or more cell groups comprises the inactive serving cells.

Aspect 39: The method of any of aspects 23 through 38, wherein the first control signaling further indicates a set of L1 report configurations associated with the inactive serving cells.

Aspect 40: The method of any of aspects 23 through 39, wherein the L1 report configuration indicates the one or more channel measurements to be performed by the UE, one or more quantities associated with the one or more channel measurements to be included in the L1 report, one or more physical cell identifiers associated with the one or more cell groups, or a combination thereof.

Aspect 41: The method of aspect 40, wherein the one or more quantities associated with the one or more channel measurements comprise a first channel measurement value associated with a first cell of the one or more cell groups and a first differential value with respect to the first channel measurement value and associated with a second cell of the one or more cell groups.

Aspect 42: An apparatus for wireless communications at a UE, comprising a processor; memory coupled with the processor; and instructions stored in the memory and executable by the processor to cause the apparatus to perform a method of any of aspects 1 through 22.

Aspect 43: An apparatus for wireless communications at a UE, comprising at least one means for performing a method of any of aspects 1 through 22.

Aspect 44: A non-transitory computer-readable medium storing code for wireless communications at a UE, the code comprising instructions executable by a processor to perform a method of any of aspects 1 through 22.

Aspect 45: An apparatus for wireless communications at a network entity, comprising a processor; memory coupled with the processor; and instructions stored in the memory and executable by the processor to cause the apparatus to perform a method of any of aspects 23 through 41.

Aspect 46: An apparatus for wireless communications at a network entity, comprising at least one means for performing a method of any of aspects 23 through 41.

Aspect 47: A non-transitory computer-readable medium storing code for wireless communications at a network entity, the code comprising instructions executable by a processor to perform a method of any of aspects 23 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    one or more memories; and
    one or more processors coupled to the one or more memories and configured to:
        receive first control signaling indicating a configuration of a set of serving cells for inter-cell mobility procedures, the first control signaling further indicating a layer one report configuration for reporting measurements associated with one or more cell groups of the set of serving cells via a layer one report, wherein the one or more cell groups comprise both active serving cells and inactive serving cells for the inter-cell mobility procedures;

identify, based at least in part on the layer one report configuration, a reference cell group from the one or more cell groups, the reference cell group comprising a threshold quantity of serving cells for channel measurement and reporting;

receive second control signaling indicating a second reporting format for the layer one report that is modified with respect to a first reporting format indicated by the first control signaling, wherein the second control signaling indicates one or more serving cells for the channel measurement and reporting that have changed with respect to serving cells of the reference cell group; and update the layer one report configuration based at least in part on the second reporting format, the layer one report being based at least in part on the updated layer one report configuration and the one or more serving cells indicated via the second control signaling;

perform one or more channel measurements for the one or more serving cells based at least in part on the updated layer one report configuration; and transmit the layer one report comprising channel information for the one or more serving cells based at least in part on the one or more channel measurements, wherein the layer one report comprises the channel information for the one or more serving cells in accordance with the second control signaling.

2. The apparatus of claim 1, wherein the second control signaling further comprises an indication of one or more parameters for the layer one report configuration, and the one or more processors are further configured to:

update the layer one report configuration based at least in part on the one or more parameters, wherein the channel information is reported via the layer one report in accordance with the updated layer one report configuration.

3. The apparatus of claim 2, wherein the one or more parameters comprise a report configuration or a report periodicity, or both, the channel information being reported via the layer one report based at least in part on the report configuration or the report periodicity, or both.

4. The apparatus of claim 1, wherein the second control signaling comprises a bitmap for respective cell indices associated with each serving cell of the set of serving cells.

5. The apparatus of claim 1, wherein the one or more processors are further configured to:

receive, within the first control signaling, an indication of the reference cell group, wherein the reference cell group is identified based at least in part on the first control signaling.

6. The apparatus of claim 1, wherein the reference cell group comprises a predefined set of serving cells.

7. The apparatus of claim 1, wherein the reference cell group comprises a set of one or more serving cells included in a prior layer one report.

8. The apparatus of claim 1, wherein the second control signaling indicates a subset of serving cells from the one or more cell groups for channel measurement and reporting, the subset of serving cells selected from a plurality of subsets of serving cells, and wherein the one or more processors are further configured to:

perform the one or more channel measurements for the subset of serving cells based at least in part on the second control signaling, wherein the layer one report comprises channel information for the subset of serving cells in accordance with the second control signaling.

9. The apparatus of claim 8, wherein respective subsets of serving cells of the plurality of subsets of serving cells are based at least in part on a cell location, a cell status, or any combination thereof.

10. The apparatus of claim 1, wherein the one or more processors are further configured to:

maintain the updated layer one report configuration for transmitting one or more layer one reports until additional control signaling is received.

11. The apparatus of claim 1, wherein the one or more processors are further configured to:

maintain the updated layer one report configuration for transmitting one or more layer one reports based at least in part on a time duration or a quantity of layer one reports, or both.

12. The apparatus of claim 1, wherein the one or more processors are further configured to:

update the layer one report configuration after a time duration, the time duration being based at least in part on receiving the second control signaling, an acknowledgment associated with the second control signaling, a configured timer associated with receiving the second control signaling, or any combination thereof.

13. The apparatus of claim 1, wherein the one or more processors are further configured to:

perform a first set of channel measurements for a first cell group based at least in part on the first reporting format for the layer one report configuration; and perform a second set of channel measurements for a second cell group based at least in part on the second reporting format for the layer one report configuration, wherein the layer one report comprises channel information associated with the first cell group and the second cell group based at least in part on the first set of channel measurements and the second set of channel measurements, the layer one report being transmitted in accordance with the first reporting format for the layer one report configuration and the second reporting format for the layer one report configuration.

14. The apparatus of claim 13, wherein the first cell group of the one or more cell groups comprises the active serving cells and the second cell group of the one or more cell groups comprises the inactive serving cells.

15. The apparatus of claim 1, wherein the one or more cell groups are based at least in part on at least one of an activation status and a candidate cell set for the inter-cell mobility procedures.

16. The apparatus of claim 15, wherein a first cell group of the one or more cell groups comprises the active serving cells and a second cell group of the one or more cell groups comprises the inactive serving cells.

17. The apparatus of claim 1, wherein the first control signaling further indicates a set of layer one report configurations associated with the inactive serving cells.

18. The apparatus of claim 1, wherein the layer one report configuration indicates the one or more channel measurements to be performed by the UE, one or more quantities associated with the one or more channel measurements to be included in the layer one report, one or more physical cell identifiers associated with the one or more cell groups, or a combination thereof.

19. The apparatus of claim 18, wherein the one or more quantities associated with the one or more channel measurements comprise a first channel measurement value associated with a first cell of the one or more cell groups and a first differential value with respect to the first channel measurement value and associated with a second cell of the one or more cell groups.

20. An apparatus for wireless communications at a network entity, comprising:
one or more memories; and
one or more processors coupled to the one or more memories and configured to:
transmit first control signaling indicating a configuration of a set of serving cells for inter-cell mobility procedures, the first control signaling further indicating a layer one report configuration for reporting measurements associated with one or more cell groups of the set of serving cells via a layer one report, wherein the one or more cell groups comprise both active serving cells and inactive serving cells for the inter-cell mobility procedures;
select a reference cell group from the one or more cell groups, the reference cell group comprising a threshold quantity of serving cells for channel measurement and reporting;
transmit second control signaling indicating a second reporting format for the layer one report that is modified with respect to a first reporting format indicated by the first control signaling, wherein the second control signaling indicates one or more serving cells for the channel measurement and reporting that have changed with respect to serving cells of the reference cell group; and
receive the layer one report comprising channel information for the one or more serving cells based at least in part on one or more channel measurements, wherein layer one report comprises the channel information for the one or more serving cells in accordance with the second control signaling.

21. The apparatus of claim 20, wherein the one or more processors are further configured to:
transmit, within the first control signaling, an indication of the reference cell group, wherein the reference cell group is identified based at least in part on the first control signaling.

22. The apparatus of claim 20, wherein the first control signaling further indicates a set of layer one report configurations associated with the inactive serving cells.

23. A method for wireless communications at a user equipment (UE), comprising:
receiving first control signaling indicating a configuration of a set of serving cells for inter-cell mobility procedures, the first control signaling further indicating a layer one report configuration for reporting measurements associated with one or more cell groups of the set of serving cells via a layer one report, wherein the one or more cell groups comprise both active serving cells and inactive serving cells for the inter-cell mobility procedures;
identifying, based at least in part on the layer one report configuration, a reference cell group from the one or more cell groups, the reference cell group comprising a threshold quantity of serving cells for channel measurement and reporting;
receiving second control signaling indicating a second reporting format for the layer one report that is modified with respect to a first reporting format indicated by the first control signaling, wherein the second control signaling indicates one or more serving cells for the channel measurement and reporting that have changed with respect to serving cells of the reference cell group; and
updating the layer one report configuration based at least in part on the second reporting format, the layer one report being based at least in part on the updated layer one report configuration and the one or more serving cells indicated via the second control signaling;
performing one or more channel measurements for the one or more serving cells based at least in part on the updated layer one report configuration; and
transmitting the layer one report comprising channel information for the one or more serving cells based at least in part on the one or more channel measurements, wherein the layer one report comprises the channel information for the one or more serving cells in accordance with the second control signaling.

24. A method for wireless communications at a network entity, comprising:
transmitting first control signaling indicating a configuration of a set of serving cells for inter-cell mobility procedures, the first control signaling further indicating a layer one report configuration for reporting measurements associated with one or more cell groups of the set of serving cells via a layer one report, wherein the one or more cell groups comprise both active serving cells and inactive serving cells for the inter-cell mobility procedures;
selecting a reference cell group from the one or more cell groups, the reference cell group comprising a threshold quantity of serving cells for channel measurement and reporting;
transmitting second control signaling indicating a second reporting format for the layer one report that is modified with respect to a first reporting format indicated by the first control signaling, wherein the second control signaling indicates one or more serving cells for the channel measurement and reporting that have changed with respect to serving cells of the reference cell group; and
receiving the layer one report comprising channel information for the one or more serving cells based at least in part on one or more channel measurements, wherein layer one report comprises the channel information for the one or more serving cells in accordance with the second control signaling.

* * * * *